US010929718B2

(12) United States Patent
Tsunoda et al.

(10) Patent No.: US 10,929,718 B2
(45) Date of Patent: Feb. 23, 2021

(54) IMAGE RECOGNITION APPARATUS, LEARNING APPARATUS, IMAGE RECOGNITION METHOD, LEARNING METHOD, AND STORAGE MEDIUM

(71) Applicant: CANON KABUSHIKI KAISHA, Tokyo (JP)

(72) Inventors: Takamasa Tsunoda, Tokyo (JP); Masakazu Matsugu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 16/015,977

(22) Filed: Jun. 22, 2018

(65) Prior Publication Data
US 2019/0005356 A1    Jan. 3, 2019

(30) Foreign Application Priority Data

Jun. 30, 2017    (JP) .................. 2017-128958

(51) Int. Cl.
| G06K 9/00 | (2006.01) |
| G06K 9/62 | (2006.01) |
| G06T 7/90 | (2017.01) |
| G06T 7/174 | (2017.01) |
| G06K 9/03 | (2006.01) |

(52) U.S. Cl.
CPC ....... *G06K 9/6262* (2013.01); *G06K 9/00664* (2013.01); *G06K 9/628* (2013.01); *G06T 7/174* (2017.01); *G06T 7/90* (2017.01); *G06K 9/036* (2013.01); *G06T 2207/20081* (2013.01)

(58) Field of Classification Search
None
See application file for complete search history.

(56) References Cited

U.S. PATENT DOCUMENTS

| 8,111,923 B2 * | 2/2012 | Csurka ................. G06K 9/4676 |
| | | 382/190 |
| 10,303,983 B2 * | 5/2019 | Tsunoda ............... G06K 9/6219 |

FOREIGN PATENT DOCUMENTS

JP    2010-183190 A    8/2010

OTHER PUBLICATIONS

Shopovska et al., "Efficient approach for scene understanding by low confidence region boosting", MMSP 2013 (Year: 2013).*

(Continued)

*Primary Examiner* — Soo Jin Park
(74) *Attorney, Agent, or Firm* — Canon U.S.A., Inc. IP Division

(57) ABSTRACT

An apparatus includes an acquisition unit that acquires a first image based on a first parameter, and a second image based on a second parameter, a segmentation unit that segments each of the first and second images into a plurality of segments, an acquisition unit that acquires feature quantities from each of the plurality of segments formed by segmenting the first and second images, respectively, a calculation unit that calculates a reliability of each of the plurality of segments of the first image based on the feature quantities acquired from the first image, a classification unit that classifies the plurality of segments of the first image into a first field having a relatively high reliability and a second field having a relatively low reliability, and a determination unit that determines categories for the first and second fields based on the feature quantities acquired from the first and second images.

16 Claims, 20 Drawing Sheets

IMAGE

SEMANTIC SEGMENTATION GT

(56) References Cited

OTHER PUBLICATIONS

Arbelaez et al., "Semantic segmentation using regions and parts", CVPR 2012 (Year: 2012).*
Singh et al., "Introspective semantic segmentation", WCACV 2014 (Year: 2014).*
Radhakrishna Achanta et al; "SLIC Superpixels;" EPFL (Ecole Polytechnique Fedrale de Lausanne) Technical Report 149300, Jun. 2010; pp. 1-15.
A. P. Dempster et al.; Maximum Likelihood from Incomplete Data via the EM Algorithm; Journal of the Royal Statistical Society. Series B (Methodological), vol. 39, No. 1. (1977), pp. 1-39.
Ren Ng et al.; "Light Field Photography with a Hand-held Plenoptic Camera;" Stanford University Computer Science Tech Report CTSR Feb. 2005; pp. 1-11.
Shree K. Nayar et al.; "High Dynamic Range Imaging: Spatially Varying Pixel Exposures;" CVPR2000; pp. 1-8.

* cited by examiner

IMAGE

SEMANTIC SEGMENTATION GT

SEMANTIC SEGMENTATION
604 Sky
605 Body
606 Water

SEGMENTATION

IMAGE
601 SKY
602 PERSON
603 SEA

RELIABILITY DETERMINATION RESULT
804 HIGH-RELIABILITY FIELD
805 LOW-RELIABILITY FIELD

SEGMENTATION

IMAGE
801 BLUE SKY
802 CLOUD
803 TREES

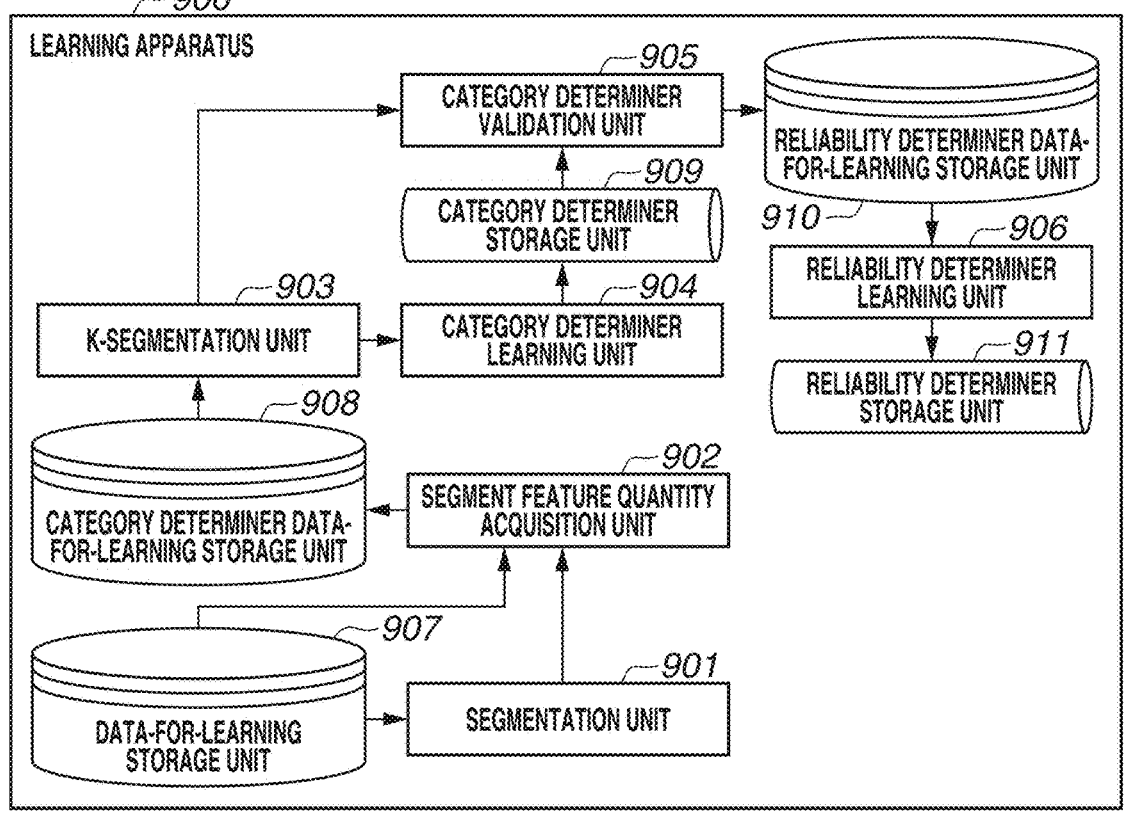
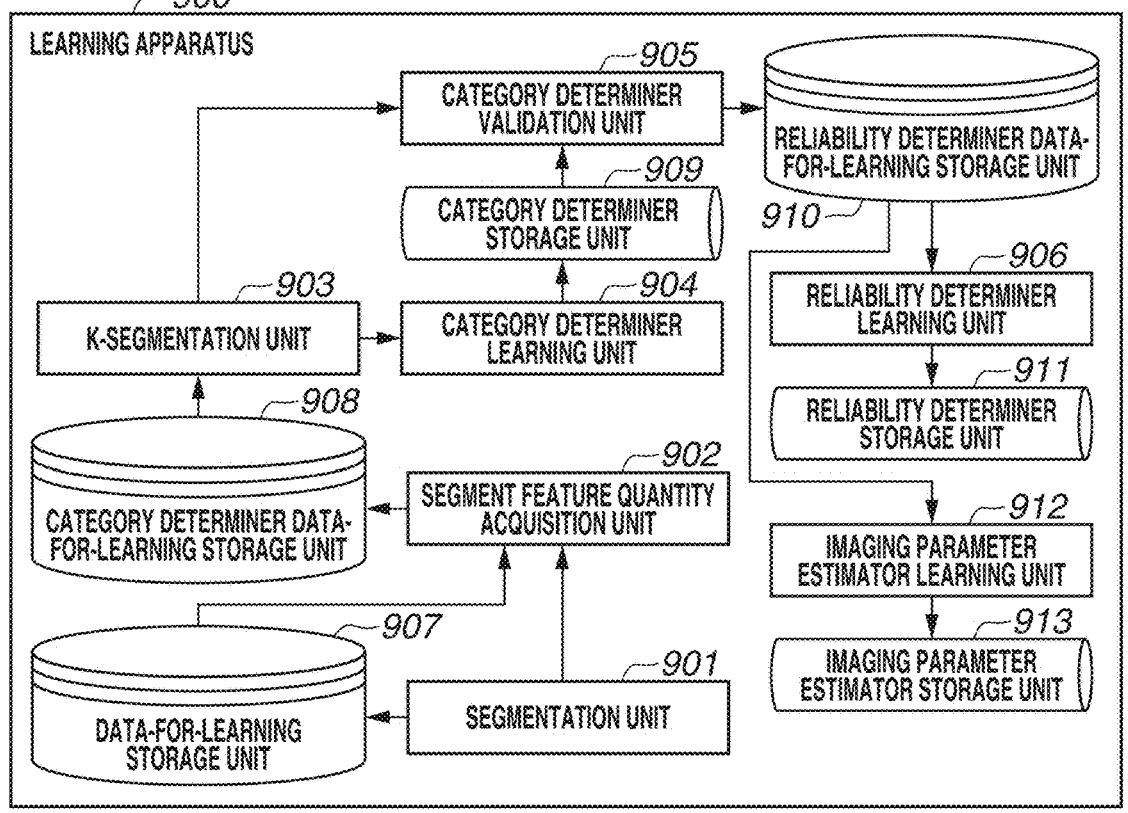

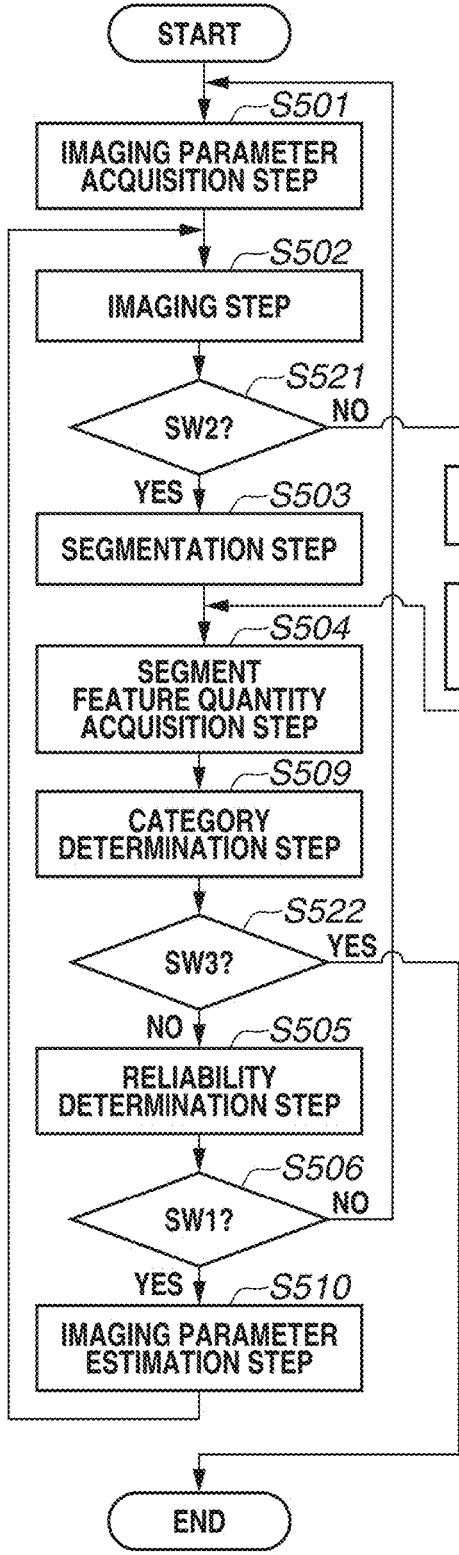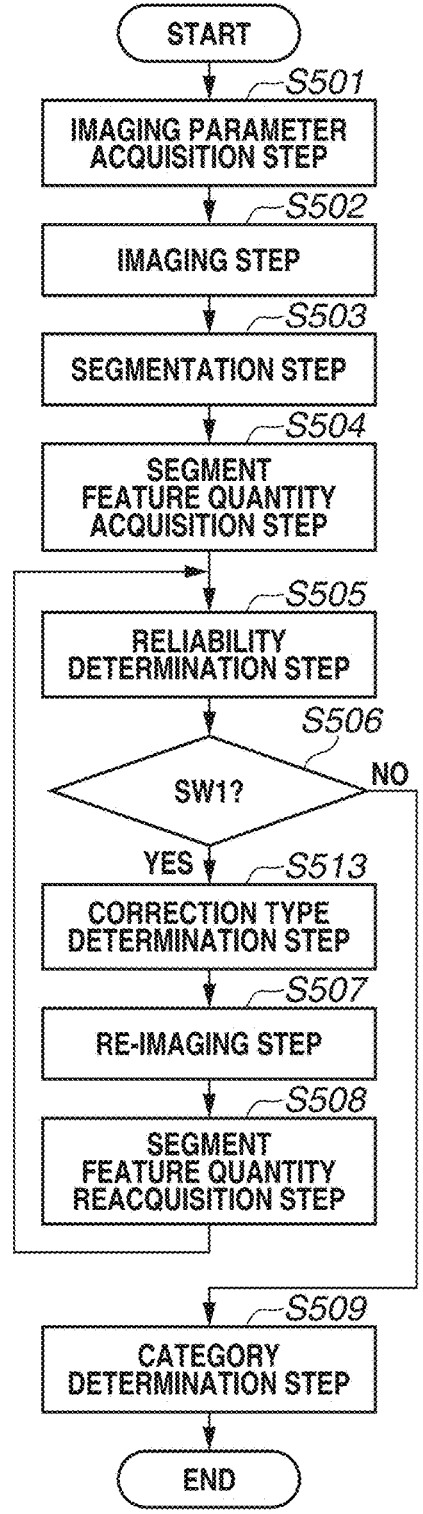

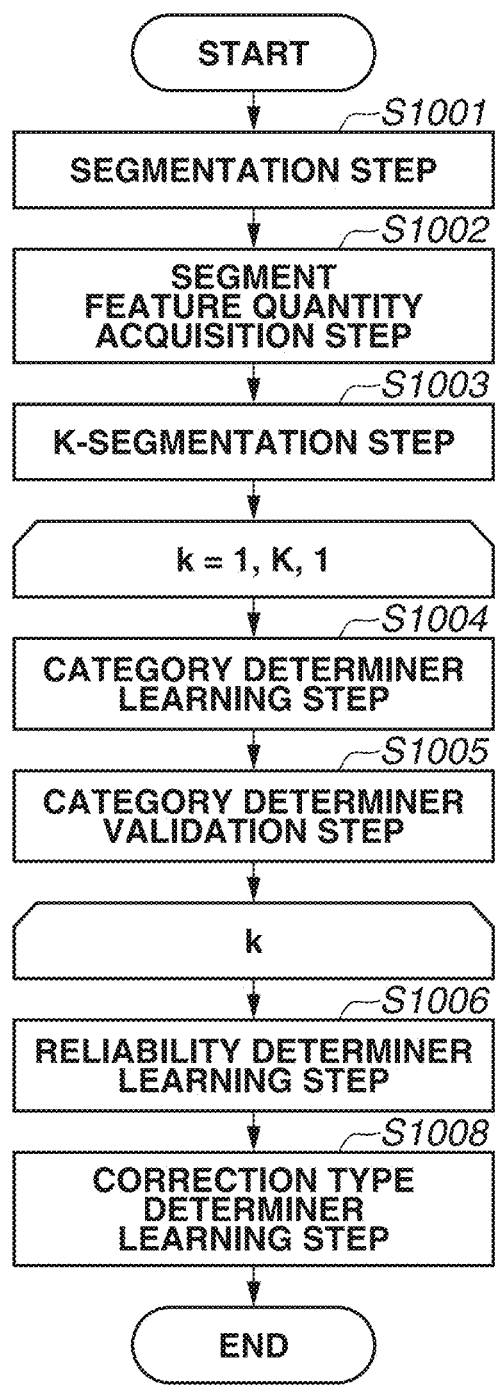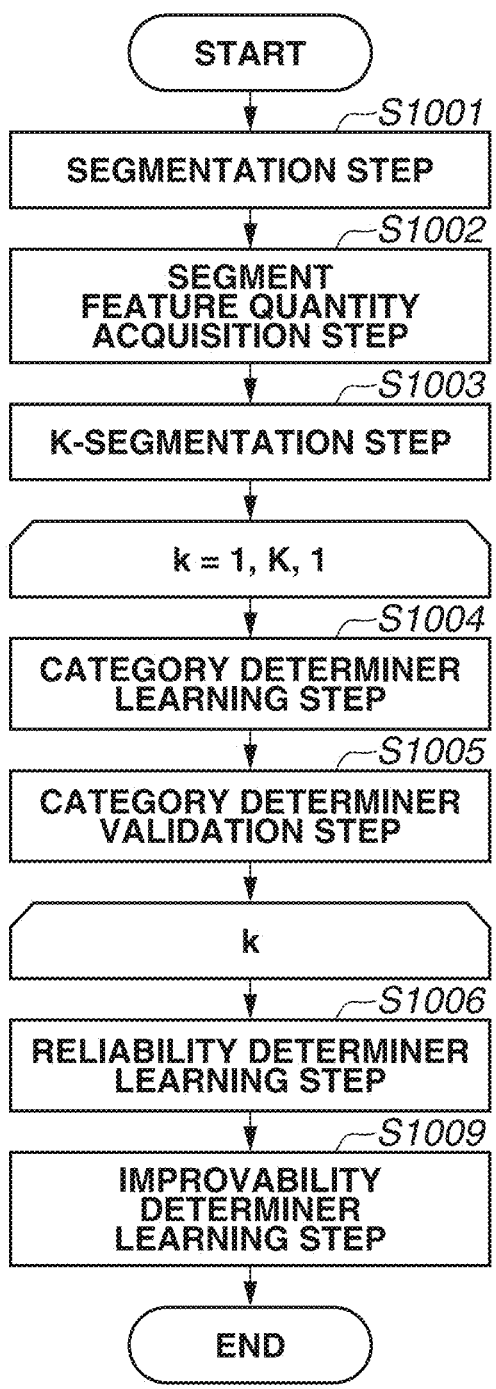

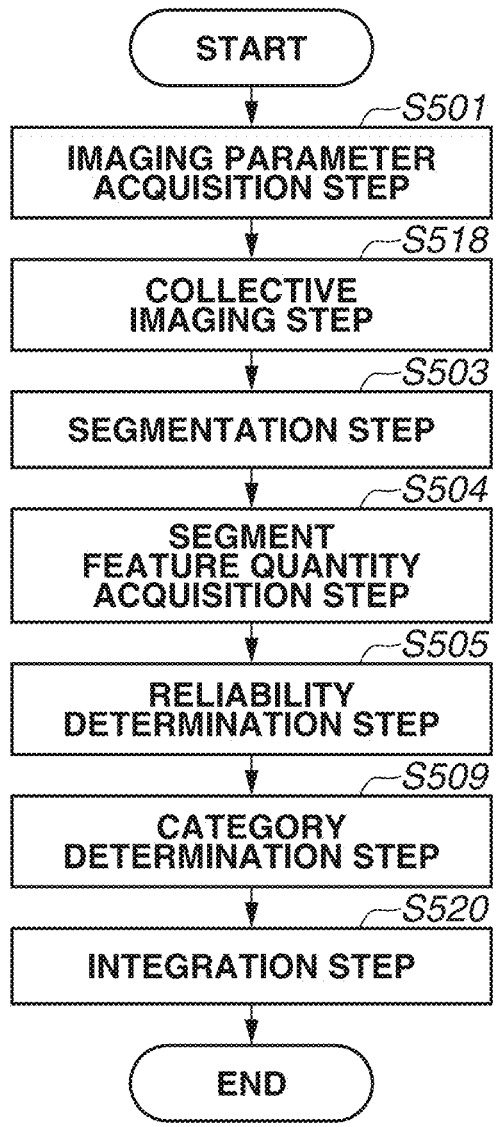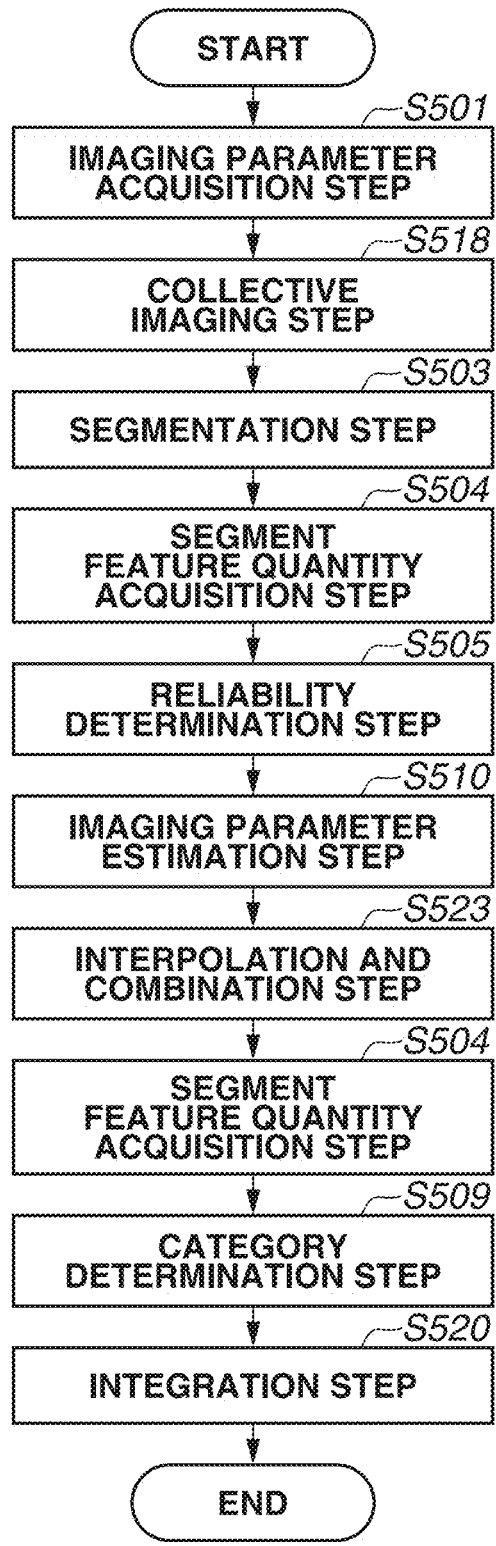

IMAGE RECOGNITION APPARATUS, LEARNING APPARATUS, IMAGE RECOGNITION METHOD, LEARNING METHOD, AND STORAGE MEDIUM

BACKGROUND OF THE INVENTION

Field of the Invention

The aspect of the embodiments relates to an image recognition technique for recognizing a target based on an image.

Description of the Related Art

Known image recognition techniques for recognizing a target in an image include face recognition for recognizing the position of a face existing in the image, human body detection for detecting a human body, scene recognition for recognizing an environment and a situation where the image is captured, and Semantic Segmentation for recognizing a semantic category of each pixel in the image. In Semantic Segmentation, categories "Body", "Building", "Sky", and "Car" are defined by a user with respect to fields "person", "building", "sky", and "car", respectively, in the image. Then, category recognition for a local field in the image is performed based on feature quantities of the field. Category recognition includes noise reduction suitable for a recognition target subject field, field-specific image processing such as color tone correction, image compression, image search, scene interpretation, and other various applicable recognition issues.

Generally, an imaging apparatus such as a digital camera has functions of auto exposure (AE) for automatically controlling exposure, auto white balance (AWB) for correcting color change of a subject based on the color appearance of a light source, and auto focus (AF) for focusing a lens on the subject. Although optimal imaging control is achieved by using these functions, these functions are directed to generating an image having suitable image quality, and are not primarily directed to improving the accuracy of image recognition. On the other hand, there are many cases where the recognition accuracy is improved by performing image recognition on an image captured based on imaging parameters suitably set according to the recognition target.

Japanese Patent Application Laid-Open No. 2010-183190 discusses a technique for using a live view image of a digital camera, controlling the luminance level to fall within a target, and acquiring an image, with exposure readjusted particularly in a dark condition, thus improving the accuracy of scene determination. The technique achieves face detection and scene determination with high accuracy by actively controlling exposure.

However, the technique discussed in Japanese Patent Application Laid-Open No. 2010-183190 determines whether the luminance level falls within a range to determine whether to correct exposure. Therefore, in image recognition involving category determination for each field, such as Semantic Segmentation, suitable imaging parameters are not set to improve the recognition accuracy. The present disclosure is directed to making it possible to determine the category of each field of an image with high accuracy.

SUMMARY OF THE INVENTION

According to an aspect of the embodiments, an apparatus includes an image acquisition unit configured to acquire a first image captured by an imaging unit based on a first parameter, and a second image captured by the imaging unit based on a second parameter, a segmentation unit configured to segment each of the first image and the second image into a plurality of segments, a feature quantity acquisition unit configured to acquire feature quantities from each of the plurality of segments formed by segmenting the first image and the second image, respectively, a calculation unit configured to calculate a reliability of each of the plurality of segments of the first image based on the feature quantities acquired from the plurality of segments of the first image, a classification unit configured to classify the plurality of segments of the first image into a first field having a relatively high reliability and a second field having a relatively low reliability, and a determination unit configured to determine categories for the first field and the second field based on the feature quantities acquired from the first image and the feature quantities acquired from the second image.

Further features of the present disclosure will become apparent from the following description of exemplary embodiments with reference to the attached drawings.

BRIEF DESCRIPTION OF THE DRAWINGS

FIGS. 9A and 9B are block diagrams illustrating functional configurations of a learning apparatus according to each exemplary embodiment.

FIGS. 14A and 14B are flowcharts illustrating other recognition processing in the image recognition apparatus according to each exemplary embodiment.

FIGS. 16A and 16B are flowcharts illustrating other learning processing in the learning apparatus according to each exemplary embodiment.

FIGS. 20A and 20B are flowcharts illustrating yet other recognition processing in the image recognition apparatus according to each exemplary embodiment.

DESCRIPTION OF THE EMBODIMENTS

A first exemplary embodiment of the present disclosure will be described in detail below with reference to the accompanying drawings. The present exemplary embodiment determines the fallibility in category determination in a local field in an image captured by an imaging apparatus (digital still camera) serving as an image recognition apparatus. The present exemplary embodiment will be described below centering on an example where high-accuracy Semantic Segmentation is achieved by setting more suitable imaging parameters to a field liable to err and performing re-capturing. The present exemplary embodiment particularly handles imaging parameters related to exposure.

Figure 1A:
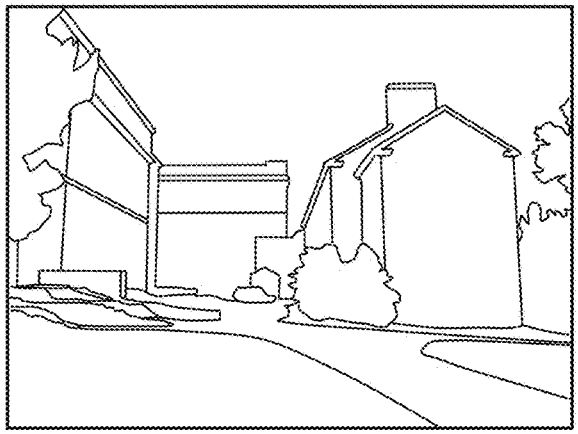
FIGS. 1A and 1B illustrate a relationship between an input image and a category of each field therein according to a first exemplary embodiment.
Figure 1B:
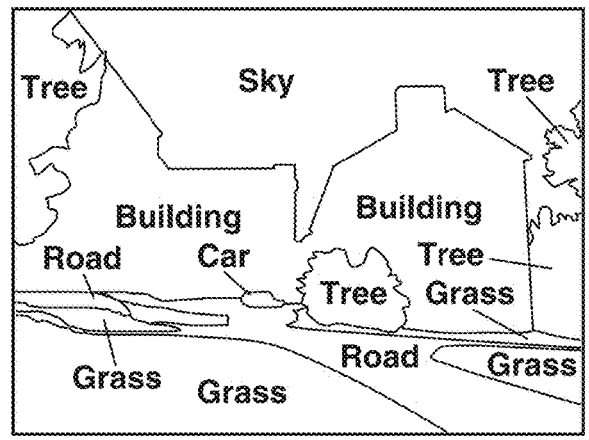

Semantic Segmentation refers to an image recognition issue for recognizing the category of a field occupied by a recognition target in an image based on feature quantities of the field. FIGS. 1A and 1B illustrate examples of an input and an ideal output in Semantic Segmentation. For an input image (FIG. 1A), field categories of a recognition target, such as Sky and Building, are defined by a user, and field categories are output on a pixel basis, as illustrated in FIG. 1B. FIG. 1B represents a correct answer for the input image (FIG. 1A). A map to which correct answer field categories (correct answer categories) are assigned (given) in this way is referred to as a Ground Truth (GT).

Figure 2:
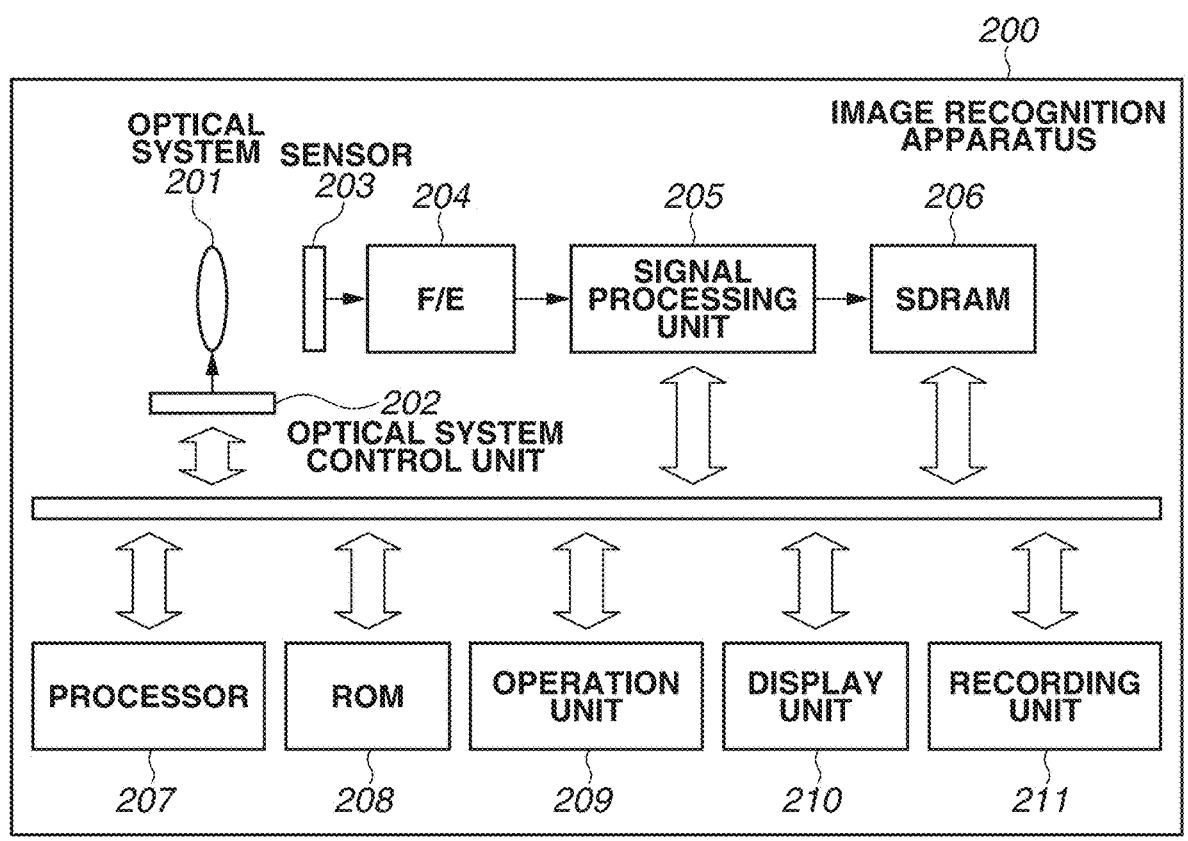
FIG. 2 is a block diagram illustrating a hardware configuration of an image processing apparatus according to the first exemplary embodiment.

FIG. 2 is a block diagram illustrating an example of a hardware configuration of an image recognition apparatus 200 according to the present exemplary embodiment. An optical system 201 includes a zoom lens, focus lens, diaphragm, and shutter. An optical system control unit 202 includes a zoom motor, focus motor, diaphragm motor, and shutter motor for controlling the zoom lens, focus lens, diaphragm, and shutter, respectively. Each motor is driven by a motor driver which receives a drive signal from a processor 207. A sensor 203 includes an image sensor for forming a subject image of light entering through the optical system 201, on a light receiving surface. Red, green, and blue (RGB) color filters are arranged in a Bayer array on pixels of the image sensor. A front end (F/E) 204 receives a subject image signal from the sensor 203, performs noise rejection, gain adjustment, and analog-to-digital (A/D) conversion on the subject image signal, and outputs the digitized subject image signal RAW-RGB to a signal processing unit 205.

Figure 3:
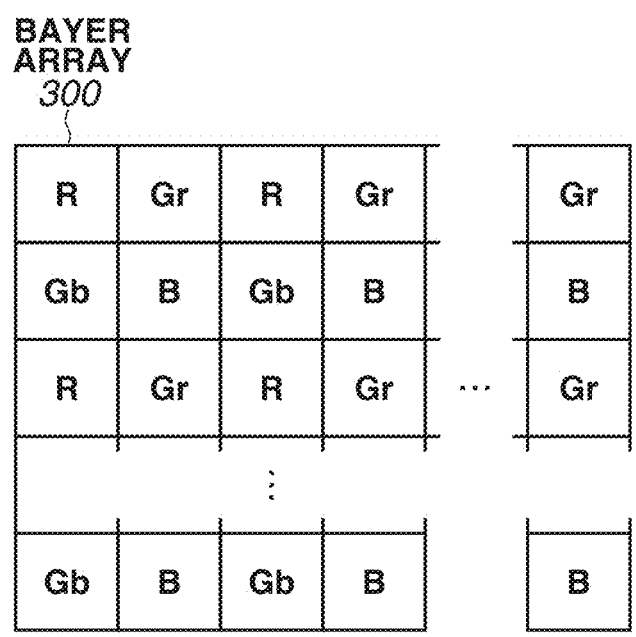
FIG. 3 illustrates a Bayer array according to the first exemplary embodiment.

RAW-RGB is an image having the RGB Bayer array. FIG. 3 illustrates an example of the Bayer array. Referring to FIG. 3, R, Gr, Gb, and B indicate visible light wavelength band pass color filters corresponding to red, green, green, and blue, respectively. Different symbols Gr and Gb are assigned to the green color filters to distinguish the arrangement. However, the green color filters have the same filter characteristics.

Returning to the description of FIG. 2, the signal processing unit 205 performs calculations of AF, AE, and AWB evaluation values and the resizing processing on an image for use in image processing in Semantic Segmentation. Calculations of the AF, AE, and AWB evaluation values will be described in detail below. The signal processing unit 205 performs other various kinds of processing required as an imaging apparatus, but detailed descriptions thereof will be omitted. Examples of such processing include black correction (Optical Black (OB) Clamp) using offset components of RAW-RGB, White Balance (WB) processing, and demosaicing processing for interpolating an RGB image having the Bayer array. Examples of processing further include color correction processing for bringing the spectrum characteristics of the RGB color filters of the image sensor close to ideal characteristics, contour correction processing for improving the resolution feeling of RGB images, and random noise to be superimposed on the output signal of the image sensor. Examples of processing further include noise reduction for reducing fixed pattern noise, gamma correction processing for correcting nonlinearities of a display, and RGB-to-YCbCr conversion processing for converting an RGB image into a YCbCr image (Y/C image).

The signal processing unit 205, the optical system control unit 202, the processor 207, a read only memory (ROM) 208, an operation unit 209, a display unit 210, and a recording unit 211 are connected with each other via a bus line. A synchronous dynamic random access memory (SDRAM) 206 stores RAW-RGB output from the F/E 204, via the signal processing unit 205. The SDRAM 206 also stores an RGB image output by the signal processing unit 205, a Y/C image, Joint Photographic Experts Group (JPEG) data and intermediate data for JPEG encoding when storing data in the recording unit 211.

The processor 207 performs Semantic Segmentation implemented by the present exemplary embodiment and JPEG encoding for data storage. JPEG encoding is implemented by performing discrete cosine transform (DCT), quantization, and Huffman encoding on a Y/C image. According to the present exemplary embodiment, a DCT coefficient matrix obtained by DCT is usable for other processing. The signal processing unit 205 and the processor 207 may be a digital circuit in which processing achieved by an application specific integrated circuit (ASIC) is implemented by hardware, a processor such as a digital signal processor (DSP) or a micro controller, or a suitable combination thereof.

A read only memory (ROM) 208 stores control programs, parameters, and constants for processing by the signal processing unit 205 and the processor 207. The operation unit 209 includes various buttons and switches, such as a power switch for turning ON power of the image recognition apparatus 200 and a release button for starting an imaging operation. The release button, which is pressed in two steps, enables switching the image recognition apparatus 200 between an imaging preparation state where an image is captured but JPEG data is not stored and an imaging operation state where JPEG data is stored. When the release button is pressed in the first step, the image recognition apparatus 200 enters the imaging preparation state where the above-described RAW-RGB is acquired, the AF and other evaluation values are calculated, and image processing is performed but JPEG data is not stored. In the imaging preparation state, the image recognition apparatus 200 performs these operations in succession. When the release button is further pressed in the second step, the image recognition apparatus 200 performs the imaging operation (image processing, recognition processing, and image quality improvement processing) by using imaging parameters and White Balance (WB) coefficients at the time, and stores JPEG data.

The display unit 210 includes a liquid crystal display (LCD) monitor for displaying a Y/C image resulting from image processing on an image captured by the image recognition apparatus 200, and a result of Semantic Segmentation processed by the processor 207. The CLD monitor further performs live viewing for continuously displaying the Y/C image in the imaging preparation state. The recording unit 211 includes a card slot and a controller for a memory card for writing an JPEG image stored in the SDRAM 206.

Figure 4A:
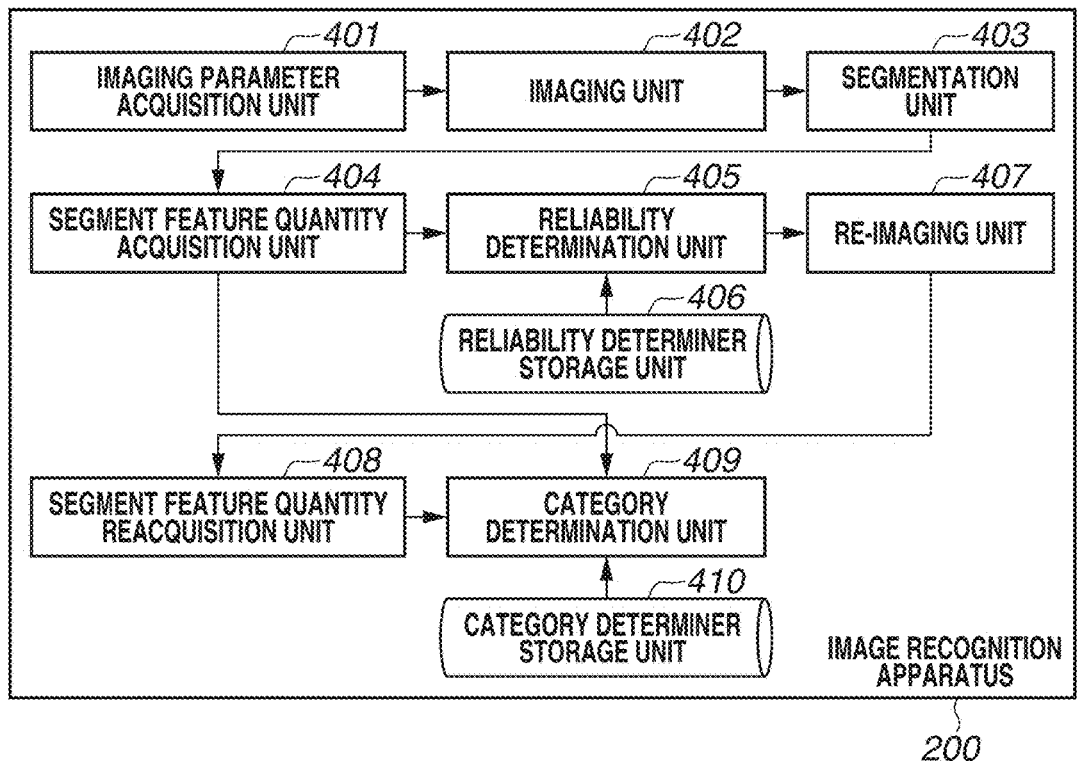
FIGS. 4A and 4B are block diagrams illustrating functional configurations of an image recognition apparatus according to each exemplary embodiment.
Figure 4B:
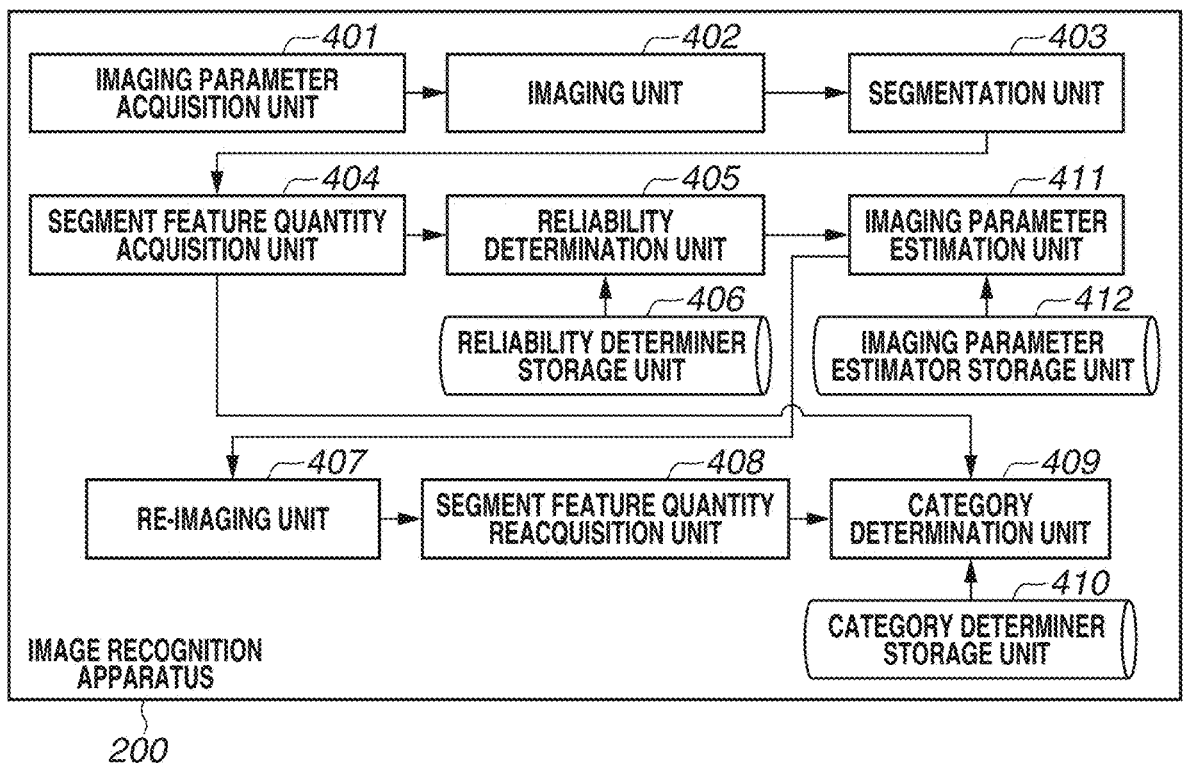

FIGS. 4A and 4B are block diagrams illustrating functional configurations of the image recognition apparatus 200 according to each exemplary embodiment. FIG. 4A illustrates a functional configuration of the image recognition apparatus 200 according to the present exemplary embodiment. The image recognition apparatus 200 according to the present exemplary embodiment includes an imaging parameter acquisition unit 401, an imaging unit 402, a segmentation unit 403, a segment feature quantity acquisition unit 404, a reliability determination unit 405, a re-imaging unit 407, a segment feature quantity reacquisition unit 408, and a category determination unit 409.

The imaging parameter acquisition unit 401, the imaging unit 402, and the re-imaging unit 407 are implemented by some functions of the optical system 201, the optical system control unit 202, the sensor 203, the F/E 204, the signal processing unit 205, and the processor 207. The segmentation unit 403, the segment feature quantity acquisition unit 404, the reliability determination unit 405, the segment feature quantity reacquisition unit 408, and the category determination unit 409 are implemented when the processor 207 executes a program stored in the ROM 208. The image recognition apparatus 200 according to the present exemplary embodiment further includes a reliability determiner storage unit 406 and a category determiner storage unit 410 as storage units which are implemented by the ROM 208. These functions included in the image recognition apparatus 200 will be described in detail below with reference to FIGS. 5A and 5B.

Figure 5A:
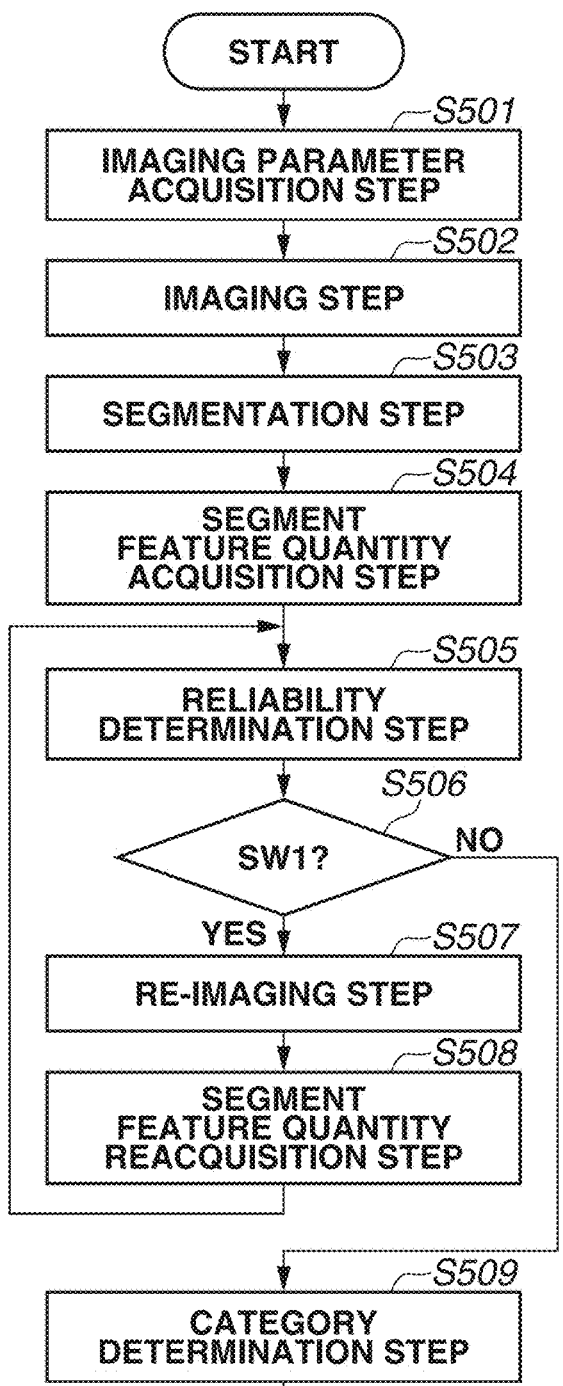
FIGS. 5A and 5B are flowcharts illustrating recognition processing in the image recognition apparatus according to each exemplary embodiment.
Figure 5B:
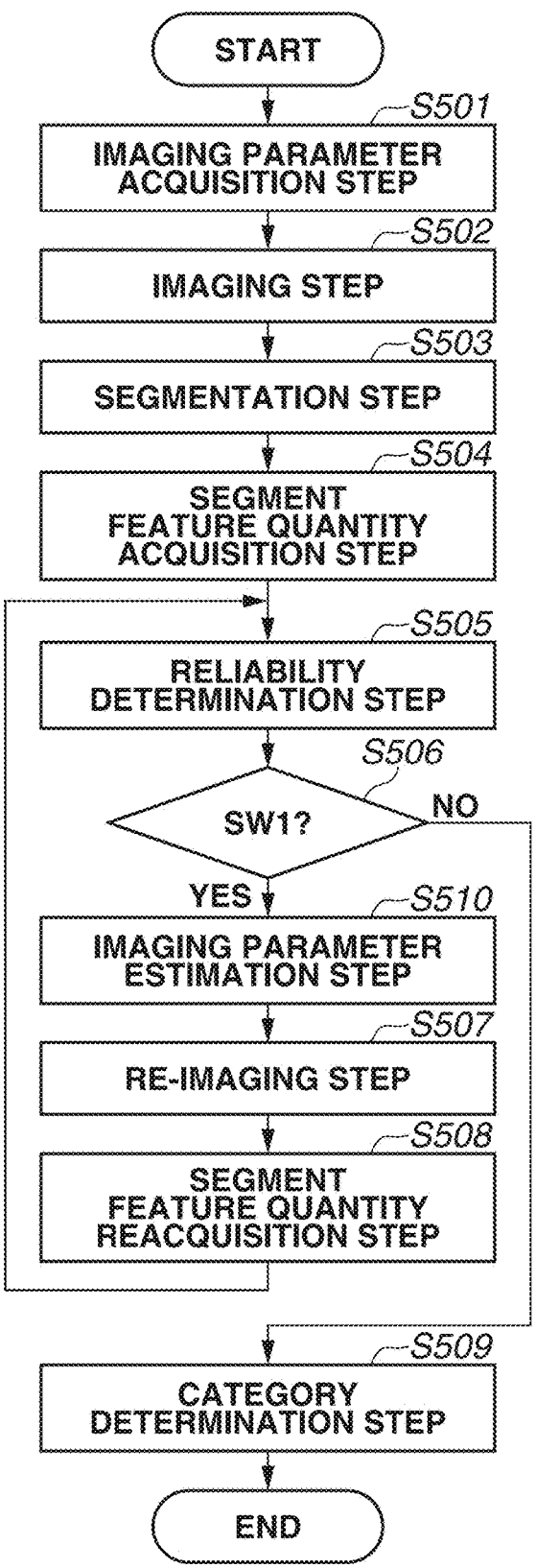

FIGS. 5A and 5B are flowcharts illustrating image recognition processing by the image recognition apparatus 200 according to each exemplary embodiment. FIG. 5A is a flowchart illustrating processing according to the present exemplary embodiment. In an imaging parameter acquisition step S501, the imaging parameter acquisition unit 401 calculates AE, AWB, and AF evaluation values based on an input original image RAW-RGB and acquires meta data such as imaging parameters and a WB coefficient to be used when capturing a recognition target image in an imaging step S502.

In the imaging step S502, the imaging unit 402 acquires a recognition target image by using the imaging parameters and WB coefficient acquired in the previous step. In a segmentation step S503, the segmentation unit 403 generates segments each of which is composed of a plurality of pixels having similar RGB values of an input image.

In a segment feature quantity acquisition step S504, the segment feature quantity acquisition unit 404 acquires the segment feature quantities based on an input image and meta data. In a reliability determination step S505, the reliability determination unit 405 determines the reliability of category determination based on the segment feature quantities by using a reliability determiner stored in the reliability determiner storage unit 406.

In a re-imaging step S507, the re-imaging unit 407 performs re-imaging by using the imaging parameters adapted to a low-reliability field with regard to the segment reliability determined in the reliability determination step S505. In a segment feature quantity reacquisition step S508, the segment feature quantity reacquisition unit 408 acquires the segment feature quantities of a low-reliability field based on the image acquired in the re-imaging step S507. In a category determination step S509, the category determination unit 409 performs field category determination based on the segment feature quantities by using a category determiner stored in the category determiner storage unit 410.

The following describes each step in more detail with reference to the flowchart illustrated in FIG. 5A. In the imaging parameter acquisition step S501, the imaging parameter acquisition unit 401 calculates the AE, AWB, and AF evaluation values and acquires as meta data the imaging parameters and WB coefficient to be used in the imaging step S502, and map information (a map of the evaluation values) to be used in the subsequent reliability determination and category determination.

The imaging parameter acquisition unit 401 digitizes a subject image formed on the image sensor 203 via the optical system 201 of the image recognition apparatus 200 by using the F/E 204 to generate RAW-RGB as an image having RGB components arranged in the Bayer array. Then, the imaging parameter acquisition unit 401 calculates the AE and AWB evaluation values based on integration values of the RGB values in RAW-RGB. The imaging parameter acquisition unit 401 segments the image plane corresponding to the light receiving surface of all pixels of the image sensor 203 into 256 blocks (16 blocks in the horizontal direction by 16 blocks in the vertical direction) and acquires the RGB integration values in each block.

In AE, a brightness value (BV) for each block in the image plane is acquired as the AE evaluation value from the RGB integration values, and a suitable exposure value (EV) is determined based on the luminance distribution. Then, imaging parameters (exposure time, diaphragm value, etc.) are set based on the determined EV.

In AWB, a white (colorless) field and the color temperature in the field are estimated based on the RGB integration values in each block. The WB coefficient is determined based on the estimated color temperature. The WB coefficient is a multiplier of the pixel values of the RGB channels to correct change of the subject's appearance due to the color appearance of the light source. In this case, the estimated color temperature is assumed to be the AWB evaluation value.

According to the present exemplary embodiment, when the release switch of the operation unit 209 of the image recognition apparatus 200 in FIG. 2 is pressed in the first step and the image recognition apparatus 200 enters the imaging preparation state, the above-described AE and AWB processing is performed in succession in the imaging preparation state.

In AF, the imaging parameter acquisition unit 401 segments the image plane into about 100 blocks (10 blocks in the horizontal direction by 10 blocks in the vertical direction) and, for each block, acquires as the AF evaluation values the integration value of differences in pixel values of adjoining pixels and the integration value (contrast value) of response values of a high-frequency component extraction filter. Normally, when a subject is in the in-focus state, the high-frequency component (contrast value) of the subject is maximized. In the AF operation, the processor 207 instructs the optical system control unit 202 to operate and move the focus lens of the optical system 201 to search for the focus lens position at which the contract value is maximized. The above-described processing is a basic operation in image capturing by an imaging apparatus such as a digital camera, more detailed descriptions thereof will be omitted.

The above-described evaluation values are also effective in the subsequent reliability determination and category determination, and therefore may be arranged as a map for use in the determinations for each field.

In AE, the image plane is segmented into about 256 blocks and the BV is acquired in each block. The BV may be used as an AE evaluation value map (BV map). A BV map for each pixel may be acquired by correcting the pixel values by using the BV for each block. An example of a method for generating a BV map will be described below.

When RAW-RGB is demosaiced and converted into an image of the three (RGB) channels, a weighted average pixel value $L^{(i)}$ to be acquired is represented by the following Formula (1), where BV denotes the brightness value of a certain block, and $r^{(i)}$, $g^{(i)}$, and $b^{(i)}$ denote the respective pixel values of the RGB channels of a pixel i.

$$L^{(i)}=0.3*r^{(i)}+0.6*g^{(i)}*0.1*b^{(i)} \qquad \text{Formula (1)}$$

Then, $L^{(i)}$ is corrected by the following Formula (2).

$$BV^{(i)}=BV+\log_2(L^{(i)}/\text{opt}) \qquad \text{Formula (2)}$$

opt denotes a constant obtained from the diaphragm value, exposure time, and sensitivity reference value of the image sensor 203, and $BV^{(i)}$ denotes the brightness value of the pixel i. Performing the above-described processing on all blocks enables acquiring a BV map for each pixel.

For the AF evaluation value, the processor 207 calculates the contrast value in about 100 blocks as described above and, in each block, searches for the focus lens position at which the contrast value is maximized. An AF evaluation value map is assumed to be a block-like map in which the contrast value is maximized at the focus lens position in each block. Since the focus lens position is convertible into the distance to the subject, the focus lens position may be converted into the distance for use in a distance map.

It is conceivable that if the number of blocks is about 100, the area (number of pixels) per block is too large and the distance map is too coarse to perform category determination on a local field. In such a case, position duplication in blocks with the same size is permitted and the contrast value is more densely calculated to increase the resolution. Alternatively, the contrast value is calculated in a duplicated way for a plurality of blocks, for example, 50, 100, or 500 blocks in each of the horizontal and vertical directions and then weighted averaging is performed to increase the resolution. Each acquired evaluation value map will be suitably used in subsequent steps as meta data for the image.

Meta data including the imaging parameters (exposure time, diaphragm value, focus lens position, etc.), WB coefficient, and evaluation value map acquired in this step is transmitted to the above-described imaging step S502.

In the imaging step S502, based on the imaging parameters acquired in the imaging parameter acquisition step S501, the imaging unit 402 captures a recognition target image to acquire an evaluation image to be subjected to Semantic Segmentation. The imaging unit 402 acquires a subject image formed on the image sensor 203 through the optical system 201 of the image recognition apparatus 200 based on the imaging parameters (exposure time, diaphragm value, focus lens position, etc.). Then, the F/E 204 digitizes the image to generate RAW-RGB.

Then, the signal processing unit 205 performs AWB processing based on the WB coefficient acquired in the previous step, and also performs regular image processing for developing RAW-RGB, such as OB clamp, demosaicing processing, color correction processing, noise reduction, contour correction processing, and gamma correction processing. These pieces of processing are well known as common processing, and detailed descriptions thereof will be omitted.

The image having undergone the above-described development processing has a large size. If the image is processed in the subsequent segmentation step S503 and segment feature quantity acquisition step S504, the calculation cost may excessively increase. Therefore, the image may be resized to the Video Graphics Array (VGA) or Quarter Video Graphics Array (QVGA) size for use in the subsequent processing. Hereinafter, unless otherwise specifically noted, an image refers to an image having undergone the development processing and resizing in this step. The image having undergone the above-described development processing is transmitted to the segmentation step S503.

In the segmentation step S503, the segmentation unit 403 segments the image into a plurality of segments. A segment refers to a field composed of a plurality of pixels having similar pixel values and positions. In the present exemplary embodiment, an image is segmented into a plurality of comparatively small fields having similar colors and positions (hereinafter, the field obtained by the segmentation is referred to as a super pixel (SP)) by using a method discussed in A. Shaji, K. Smith, A. Lucchi, "*SLIC Superpixels, R. Achanta*", *EPFL Technical Report*, 2010. Rectangularly segmented fields (grid pattern fields) may be used as SPs in addition to the above-described method.

Figure 6C:
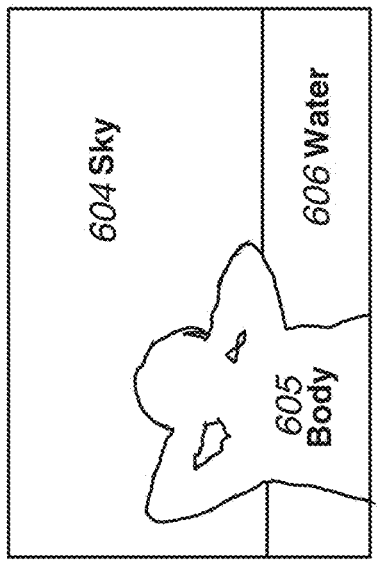
FIGS. 6A, 6B, and 6C illustrate a segmentation method according to the first exemplary embodiment.
Figure 6B:
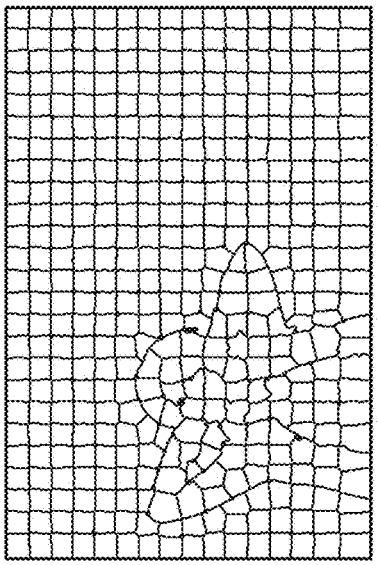
Figure 6A:
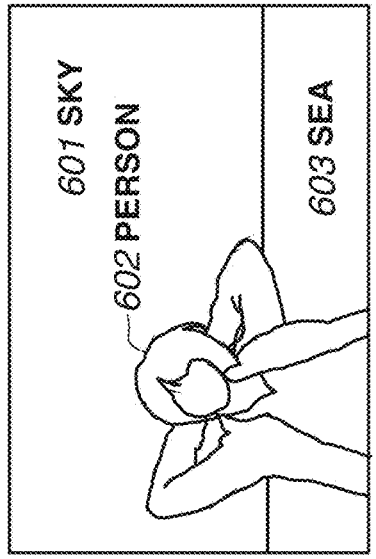

FIGS. 6A, 6B, and 6C illustrate an example of segmentation according to the present exemplary embodiment. FIG. 6B illustrates an example of a result of SP segmentation performed on an exemplary input image (FIG. 6A). The segmentation result and image generated in this way are transmitted to the segment feature quantity acquisition step S504.

In the segment feature quantity acquisition step S504, the segment feature quantity acquisition unit 404 acquires the feature quantities of SPs generated in the segmentation step S503. According to the present exemplary embodiment, a color feature quantity and a texture feature quantity are extracted from the image as feature quantities, and a statistic is calculated from the AE evaluation value map and AF evaluation value map for use as feature quantities.

A color statistic on the color feature quantity is acquired by generating a color histogram based on the RGB values in each segment of the image for segments generated in the segmentation step S503 or by obtaining a statistic such as average and standard deviation. The texture feature quantity may be obtained by calculating Local Binary Pattern (LBP) and Histogram of Gradient (HOG). The DCT coefficient for the Y/C image used in JPEG encoding may be used as the texture feature quantity.

The DCT coefficient in JPEG encoding is a multiplier for each channel of the Y/C image on an 8×8-pixel block basis. Therefore, the size of a DCT coefficient map (64-dimensional map) to be obtained is 1/64 times the original size. When using this map as the texture feature quantity, resizing in the imaging step S502 according to this size or resizing the segment according to the DCT coefficient map is to be performed. In this case, the DCT coefficient is temporarily stored in the SDRAM 206 and then read again in JPEG encoding.

Since the DCT coefficient includes the direct current (DC) component irrelevant to texture and high-frequency components are easily fluctuated by noise, not all components need to be used and the DC component and the high-frequency components may be eliminated. In this case, the DCT coefficient value in each segment is averaged for each dimension to be used, and, for example, 32-dimensional feature quantities are acquired when 32 dimensions are used.

With respect to the AE evaluation value map and AF evaluation value map, each segment is resized according to the sizes of these maps, and a histogram and statistic in each segment are acquired for each segment for use as feature quantities. The generated segment feature quantities are transmitted to the reliability determination step S505.

In the reliability determination step S505, the reliability determination unit 405 calculates the reliability of category determination for each segment by using the reliability determiner stored in the reliability determiner storage unit 406. Learning of the reliability determiner will be described in detail below in the description of the learning processing.

In the present exemplary embodiment, the reliability is estimated by using the color feature quantity liable to vary with respect to exposure and the AF evaluation value feature quantity or texture feature quantity comparatively weak to variation from among the segment feature quantities generated in the segment feature quantity acquisition step S504. The AE evaluation value feature quantity, which is a feature quantity using the BV proportional to the intensity of physical light of the subject, is robust to exposure variation as long as neither overexposure nor underexposure occurs. Therefore, at least the AE evaluation value feature quantity is not used.

Figure 7:
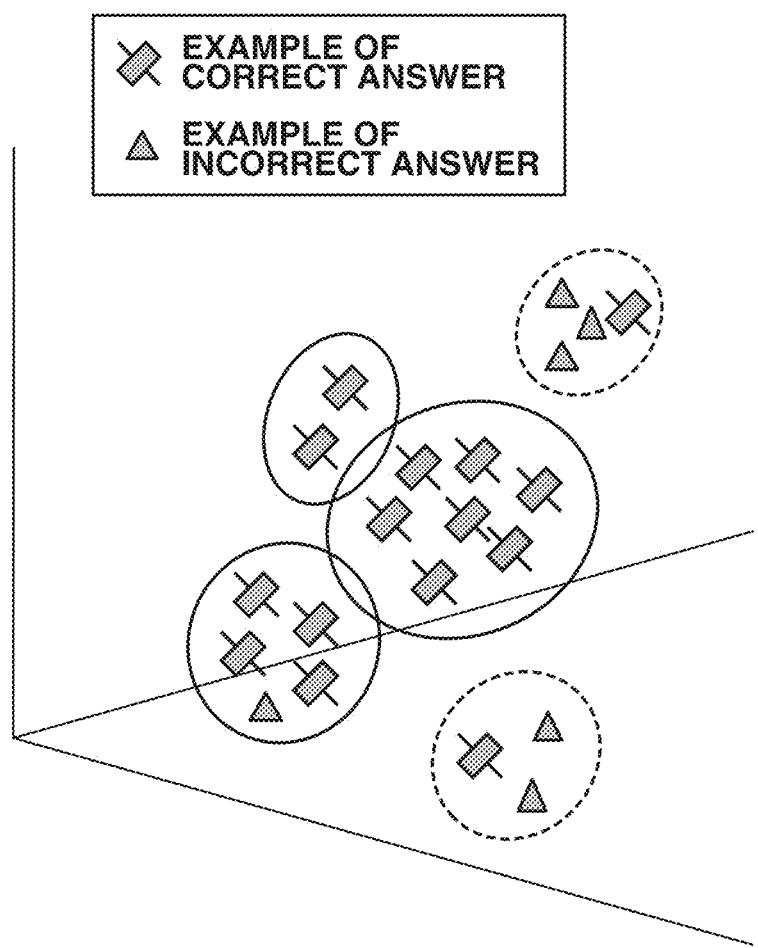
FIG. 7 illustrates a method for determining reliability according to the first exemplary embodiment.

Although described in detail in the description of the learning processing, clusters liable to cause a category determination error (FIG. 7) and clusters robust to category determination error are generated in advance by using data for learning. Although a clustering method is not limited to a specific method, Gaussian Mixture Model (GMM) is used in the present exemplary embodiment. As recognition processing, in the present exemplary embodiment, the burden rate (posterior probability) of each component is calculated based on the segment feature quantity such as the color feature quantity, and the attribution to a cluster is evaluated for each segment, with regard to GMM learning performed in the learning processing. If a cluster having the highest posterior probability is a cluster liable to cause an error, a local field in the image where the segment is located can statistically be a field liable to cause an error. FIG. 7 illustrates a method for determining reliability according to the present exemplary embodiment. As illustrated in FIG. 7, samples used in learning are associated with validity of category determination. A correct answer rate is calculated for samples in a cluster is calculated for use as reliability, and the reliability is assigned to each cluster. The reliability of samples is determined based on the cluster to which the samples in recognition belong.

Figure 8C:
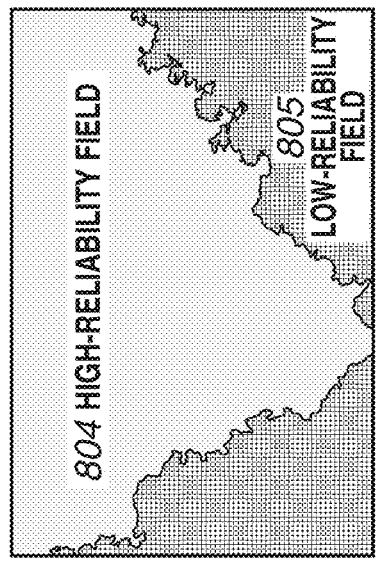
FIGS. 8A, 8B, and 8C illustrate an example of a segmentation result and reliability according to the first exemplary embodiment.
Figure 8B:
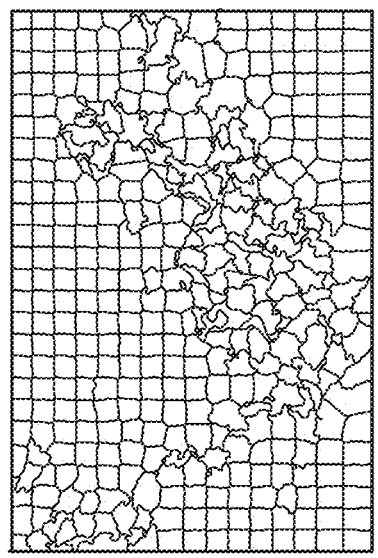
Figure 8A:
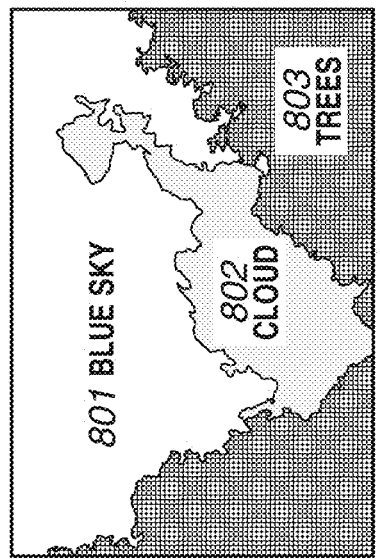

For example, generally, a local field having a tendency of underexposure is liable to cause a category determination error. FIGS. 8A, 8B, and 8C illustrate a segmentation result and the reliability of the segmentation result. Referring to an image in FIG. 8A, a sky 801 and a cloud 802 are imaged with proper exposure, and the field where trees 803 are located is darkly imaged with a kind of underexposure. A result of segmentation performed on this image is illustrated in FIG. 8B. If reliability is estimated by using the above-described method for each segment, a reliability map as illustrated in FIG. 8C is obtained. Referring to FIG. 8C, the blackish field is a low-reliability field and the whitish field is a high-reliability field. As illustrated in FIG. 8C, when adjoining segments belong to the same cluster, they are concatenated to be handled as a larger field than a segment, as with a high-reliability field 804, a low-reliability field A 805, and a low-reliability field B 806. The reliability for each segment estimated by the above-described method is transmitted to a branch SW1 step S506.

When a low-reliability field is determined to exist in the reliability determination step S505 (YES in the branch SW1 step S506), the processing proceeds to the re-imaging step S507. On the other hand, when a low-reliability field is determined not to exist (NO in the branch SW1 step S506), the processing proceeds to the category determination step S509. Thus, the reliability determination unit 405 according to the present exemplary embodiment has not only a function of calculating the reliability but also a function of classifying segments into low-reliability and high-reliability fields. A threshold value is used to determine the high or low reliability. To set a threshold value, data set for validation is prepared and a threshold value which provides the highest final category determination accuracy is searched for. In addition, a threshold value may be searched based on the data for learning by using K-Fold Cross Validation.

Although a field having reliability equal to or lower than a certain threshold value is considered as a low-reliability field to be subjected to branch, the determination method is not limited thereto. For example, branch may be performed when the threshold value falls within a specific range, and a plurality of ranges may be provided. Segments may be classified into low-reliability and high-reliability fields based on relative evaluation, among segments.

In the re-imaging step S507, the re-imaging unit 407 performs re-imaging by using suitable imaging parameters in a low-reliability field based on the reliability for each segment acquired in the reliability determination step S505. In this case, the re-imaging unit 407 performs re-imaging by adjusting the imaging parameters for each group of segments, as with the low-reliability fields A 805 and B 806 in FIG. 8C. When there is a plurality of low-reliability fields to be subjected to re-imaging, the re-imaging unit 407 performs re-imaging on the field having the lowest reliability. The following describes a case where the low-reliability field A 805 is the field having the lowest reliability.

As described above, in the present exemplary embodiment, re-imaging is performed in terms of exposure. Optimal imaging parameters for each field in this case are determined by using the AE evaluation value map acquired in the imaging parameter acquisition step S501. For example, in case of the low-reliability field A 805, the EV is obtained based on the average value of the BVs in segments in the low-reliability field A 805 by setting the International Organization for Standardization (ISO) sensitivity of the sensor 203 to a suitable value. Therefore, in this case, the diaphragm value and shutter speed are determines based on the EV. An image captured through re-imaging based on the imaging parameters is transmitted to the segment feature quantity reacquisition step S508.

In the segment feature quantity reacquisition step S508, the segment feature quantity reacquisition unit 408 acquires the feature quantities of the low-reliability field based on the image captured in the re-imaging step S507. A generated segmentation result is used for segments in the image. Since the re-imaging unit 407 performs re-imaging according to the low-reliability field A 805, in this case, the segment feature quantity reacquisition unit 408 acquires the feature quantities of the segments corresponding to the low-reliability field A 805. For other segments, the feature quantities are not acquired and the feature quantities which have already been acquired are used for category determination. Feature quantities to be acquired from an image are the same as the feature quantities acquired in the segment feature quantity acquisition step S504. The reacquired segment feature quantities of the low-reliability field are transmitted to the reliability determination step S505.

In the reliability determination step S505, the reliability determination unit 405 evaluates the reliability of the low-reliability field. If the reliability of the segments is evaluated, the reliability for each segment is transmitted to the branch SW1 step S506. In the branch SW1 step S506, the reliability determination unit 405 determines the reliability of each segment with a threshold value to determine whether to perform re-imaging. When there is no low-reliability field (NO in step S506), the processing proceeds to the category determination step S509. In addition, when the same segment as that in the last branch is a low-reliability field (NO in step S506), the fallibility of the field is not corrected through exposure correction, and therefore re-imaging is canceled. Then, the processing proceeds to the category determination step S509.

In the category determination step S509, the category determination unit 409 performs field category determination by using the category determiner stored in the category determiner storage unit 410. In this case, the category determination unit 409 performs field category determination based on the segment feature quantities acquired in the segment feature quantity acquisition step S504 and the segment feature quantity reacquisition step S508. More specifically, according to the present exemplary embodiment, the segment feature quantities include the color feature quantity, texture feature quantity, AE evaluation value feature quantity, and AF evaluation value feature quantity. In one embodiment, the category determiner is to be, for example, a classifier which inputs feature quantities and outputs a multi-class classification result as with multi-class Logistic Regression and Support Vector Machine (SVM). Learning of the category determiner will be described below in the description of the learning processing.

The following describes a method for performing learning of the reliability determiner and the category determiner used in the reliability determination step S505 and the category determination step S509, respectively, according to the present exemplary embodiment. FIGS. 9A and 9B are block diagrams illustrating functional configurations of a learning apparatus 900 according to each exemplary embodiment. FIG. 9A is a block diagram illustrating a functional configuration of the learning apparatus 900 according to the present exemplary embodiment.

The learning apparatus 900 includes a segmentation unit 901, a segment feature quantity acquisition unit 902, a K-segmentation unit 903, a category determiner learning unit 904, a category determiner validation unit 905, and a reliability determiner learning unit 906. The learning apparatus 900 further includes a data-for-learning storage unit 907, a category determiner data-for-learning storage unit 908, a category determiner storage unit 909, a reliability determiner data-for-learning storage unit 910, and a reliability determiner storage unit 911, as storage units. These functions of the learning apparatus 900 will be described in detail below with reference to FIG. 10A. The learning apparatus 900 may be implemented by using the same apparatus as the image recognition apparatus 200 or may be implemented by an apparatus different from the image recognition apparatus 200.

Figure 10A:
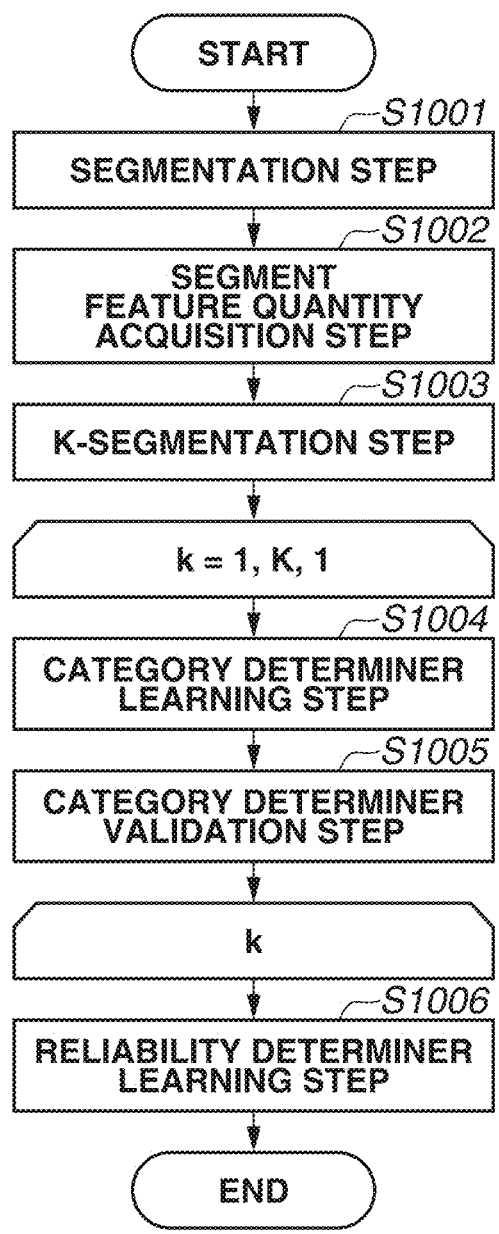
FIGS. 10A and 10B are flowcharts illustrating learning processing in the learning apparatus according to each exemplary embodiment.
Figure 10B:
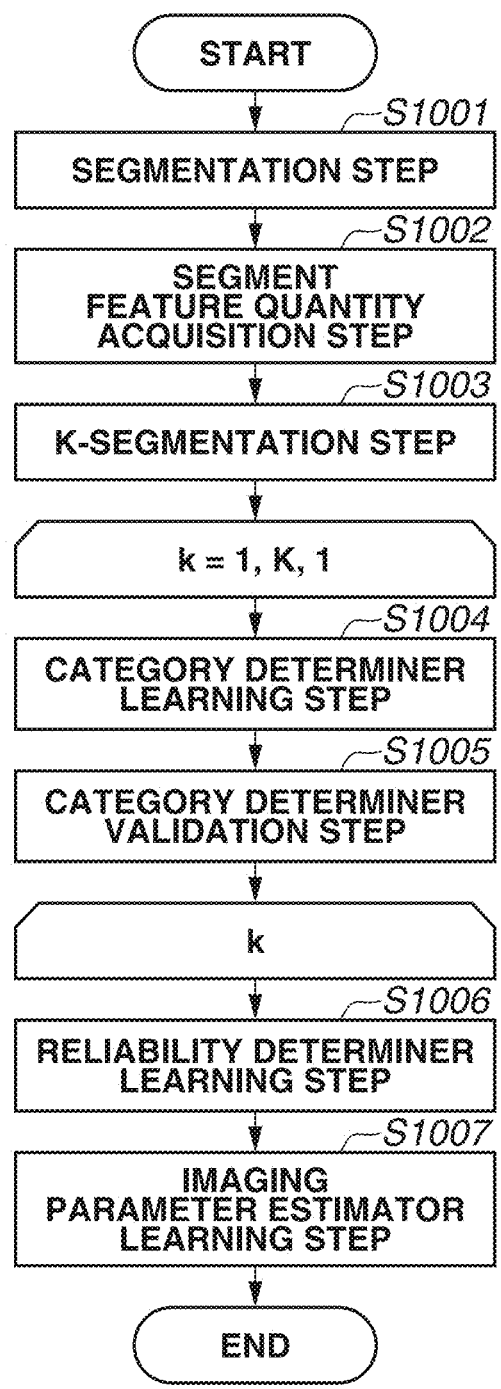

FIGS. 10A and 10B are flowcharts illustrating learning-related processing according to each exemplary embodiment. FIG. 10A is a flowchart illustrating learning processing according to the present exemplary embodiment. The overview of each step and the function of each function unit illustrated in FIG. 9A will be described below.

In a segmentation step S1001, the segmentation unit 901 generates segments each of which is composed of a plurality of pixels having similar RGB values for each image for learning stored in the data-for-learning storage unit 907. In a segment feature quantity acquisition step S1002, the segment feature quantity acquisition unit 902 acquires the segment feature quantities from the image for learning and meta data associated with the image for learning.

In a K-segmentation step S1003, the K-segmentation unit 903 segments all of the data for learning into learning data and validation data. According to the present exemplary embodiment, to perform k-segmentation cross validation, the K-segmentation unit 903 segments data set into K groups and performs learning and validation K times. More specifically, the K-segmentation unit 903 repeats the subsequent category determiner learning step S1004 and category determiner validation step S1005 K times. In the category determiner learning step S1004, the category determiner learning unit 904 performs learning of the category determiner. Then, the category determiner learning unit 904 transmits to the category determiner storage unit 909 the category determiner that has completed learning.

In the category determiner validation step S1005, the category determiner validation unit 905 estimates a result with respect to validation data of the category determiner that has completed learning in the previous step S1004. Then, the category determiner validation unit 905 transmits the result of the category determiner, and the segment category GT and segment feature quantities corresponding to the result, to the reliability determiner data-for-learning storage unit 910.

In a reliability determiner learning step S1006, the reliability determiner learning unit 906 assigns validity to the result of each category determiner evaluated with K-Fold Cross Validation K times. Then, the reliability determiner learning unit 906 performs clustering of the segment feature quantities to which validity is assigned and acquires the evaluation value (reliability) which indicates how the result of the category determiner is reliable for each cluster of the feature quantities. Then, the reliability determiner learning unit 906 transmits the model that has completed learning and the reliability for each cluster to the reliability determiner storage unit 911.

The following describes each step in more detail with reference to the flowchart illustrated in FIG. 10A.

The data-for-learning storage unit 907 stores images for learning, meta data associated with the images, and the category GT. In the segmentation step S1001, the segmentation unit 901 segments all of the images for learning stored in the data-for-learning storage unit 907 by using a method similar to that in the segmentation step S503 in the recognition processing. The generated segmentation result is transmitted to a segment feature quantity acquisition step S902.

In the segment feature quantity acquisition step S1002, the segment feature quantity acquisition unit 902 acquires the feature quantities for each segment as in the segment feature quantity acquisition step S504 in the recognition processing. In the segment feature quantity acquisition step S504, as described above, the segment feature quantity acquisition unit 902 acquires the feature quantities including the color feature quantity and texture feature quantity from the image and acquires the AE/AF evaluation value feature quantity from the AE/AF evaluation value map.

In this step, to perform learning of the category and reliability determiners, the segment feature quantity acquisition unit 902 further acquires the GT corresponding to the image from the data-for-learning storage unit 907 and generates the GT for each segment (segment GT). For example, assume a GT as illustrated in FIG. 6C, having the same image size as the image illustrated in FIG. 6A and having a category label for each pixel. A segment GT is generated by counting categories of pixels of Semantic Segmentation GT (FIG. 6C) for each segment (FIG. 6B) and assigning the category having the largest number of pixels to the GT.

The above-described segment and segment GT generation are performed on all of the images stored in the data-for-learning storage unit 907 as images for learning. Then, the segment feature quantity acquisition unit 902 stores the acquired feature quantities and segment GT in the category determiner data-for-learning storage unit 908.

In the K-segmentation step S1003, the K-segmentation unit 903 segments the data for learning into K pieces. In the present exemplary embodiment, to generate a reliability determiner based on validity of a category determination result, the data for learning is further segmented into learning data and validation data by applying K-Fold Cross Validation, and data to be used for learning of the category determiner is crossed with data to be used for learning of the reliability determiner. Therefore, in this step, the K-segmentation unit 903 segments the data for learning stored in the category determiner data-for-learning storage unit 908 into K pieces. More specifically, integer labels from 1 to K are randomly assigned to an image. In the k-th step, data of labels other than k is considered as learning data and data of the label k is considered as validation data.

Referring to the flowchart illustrated in FIG. 10A, the learning apparatus 900 repeats the category determiner learning step S1004 and the category determiner validation step S1005 K times by applying K-Fold Cross Validation. In each of the 1st to the K-th steps, the learning data and validation data set in the K-segmentation step S1003 are used.

In the category determiner learning step S1004, the category determiner learning unit 904 performs learning of the category determiner by using the k-th learning data generated in the K-segmentation step S1003. Using the segment GT and segment feature quantities of the learning data stored in the category determiner data-for-learning storage unit 908, the category determiner learning unit 904 performs learning of the classifier by using the segment feature quantities as input teacher values and the GT categories as output teacher values. Then, the category determiner learning unit 904 transmits the category determiner that has completed learning to the category determiner storage unit 909.

As described above, the category determiner is not limited to a specific determiner as long as it is a classifier for performing multi-class classification. More specifically, Random Forest and Neural Network as well as multi-class Logistic Regression and SVM are applicable to the category determiner.

In the category determiner validation step S1005, the category determiner validation unit 905 validates the category determiner that has completed learning in the previous step S1004, by using the k-th validation data generated in the K-segmentation step S1003 and acquires a category determination result for the validation data. Similar to the category determination step S302 in the recognition processing, the category determiner validation unit 905 determines the field category of the segment based on the segment feature quantities. Then, the category determiner validation unit 905 transmits the result of category determination, the field category GT corresponding to the segment, and meta data to the reliability determiner data-for-learning storage unit 910.

The above-described two steps are performed K times by applying K-Fold Cross Validation. The segment GT for the validation data in each step and the determination result of the category determiner validation step S1005 are stored in the reliability determiner data-for-learning storage unit 910.

In the reliability determiner learning step S1006, the reliability determiner learning unit 906 performs learning of the determiner for outputting the evaluation value of the reliability of each category determiner. According to the present exemplary embodiment, as described above, the reliability determiner learning unit 906 performs clustering of the feature quantities by using GMM. The feature quantities used in this case include the color feature quantity and texture feature quantity which are liable to change with exposure correction. In the present exemplary embodiment, GMM learning is performed based on the EM algorithm discussed in Dempster, A. P., N. M. Laird, D. B. Rubin, "*Maximum likelihood from incomplete data via the EM algorithm*", *Journal of the Royal Statistical Society,* 1977. More specifically, the reliability determiner learning unit 906 sets suitable initial values for parameters of average, variance-covariance matrix, and mixing coefficient. In step E, the posterior probability in the current parameters are calculated. In step M, estimated values for each parameter is calculated by using the current posterior probability. Steps E and M are repeated until the logarithmic likelihood converges. Further, the reliability determiner learning unit 906 determines the number of clusters by searching for the value with which an information amount standard such as Akaike's Information Criterion (AIC) or Bayesian information criterion (BIC) is minimized. After the above-described processing, clustering of the feature quantity can be performed.

In the segment feature quantity acquisition step S1002, the segment feature quantity acquisition unit 902 acquires the segment GT based on the GT in the data for learning. The validity of the category determination for each segment can be obtained by checking the correspondence of the GT label and the category determination result for each segment in the category determiner validation step S1005. Therefore, for all of the segment feature quantities for learning performed in the above-described clustering, the reliability determiner learning unit 906 associates the validity and calculates the correct answer rate for each cluster to be used as the reliability of the cluster.

In the reliability determiner learning step S1006, by investigating the cluster providing the highest posterior probability for the segment feature quantities in the recognition processing, the reliability determiner learning unit 906 can determine the belonging cluster and at the same time obtain the reliability associated with the determined cluster. The reliability determiner according to the present exemplary embodiment determines the belonging cluster based on the segment feature quantities in this way and investigates the reliability of the cluster to determine the reliability (score). Then, the reliability determiner learning unit 906 stores the reliability determiner that has completed learning in the reliability determiner storage unit 911.

As described above, according to the present exemplary embodiment, the learning apparatus 900 estimates a local field where a category determination error is liable to occur and the error is easily corrected through imaging parameter correction and acquires another image with exposure readjusted to the field. Therefore, in the recognition processing by the image recognition apparatus 200, it becomes possible to accurately perform category determination in each field of the classification target image.

Although, in the present exemplary embodiment, the AE evaluation value map (BV map) is stored and the imaging parameters are determined based on the BV in the re-imaging field on the BV map in the re-imaging step S507 in the recognition processing, the processing is not limited thereto. The imaging parameters of a local field may be determined with other methods. For example, as a simple method, the imaging parameters are to be determined according to a low-reliability field to be subjected to re-photometry (with an AE sensor) and re-imaging.

Although the category determination step S509 in the recognition processing according to the present exemplary embodiment is described to be performed within the imaging apparatus in addition to each piece of processing in image capturing, the present exemplary embodiment is not limited thereto. For example, the image captured in the imaging step S502, the image captured through re-imaging in the re-imaging step S507, and the imaging parameters acquired in the imaging parameter acquisition step S501 may be stored in the recording unit 211 of the image recognition apparatus 200 in FIG. 2. Then, the segmentation step S503, the segment feature quantity acquisition step S504, the reliability determination step S505, and the segment feature quantity reacquisition step S508 may be performed by an external processing apparatus. In this case, the image recognition apparatus 200 includes at least the SDRAM 206, the processor 207, the ROM 208, the operation unit 209, the display unit 210, and the recording unit 211 out of the hardware configuration of the image recognition apparatus 200 in FIG. 2.

First Modification of First Exemplary Embodiment

To perform learning of the reliability determiner, the learning apparatus 900 first performs learning of the category determiner in the learning processing. On the other hand, in the first exemplary embodiment, in the recognition processing, reliability determination is first performed, and then, category determination is performed. Therefore, in case of a low-reliability field, re-imaging is performed according to the field to reacquire the feature quantities and therefore the segment feature quantities input to the category determiner will fall within a limited exposure range. More specifically, data different from the population distribution of the data learned in the learning processing will be handled in the recognition processing.

To improve the final recognition accuracy, it may be necessary to perform relearning of the category determiner based on data having the same population distribution as the data handled in the recognition processing. The present modification will be described below centering on a method for performing relearning of the category determiner to be used by the category determination unit 409 in the first exemplary embodiment, based on data having the same population distribution as the data handled in the recognition processing.

Figure 11:
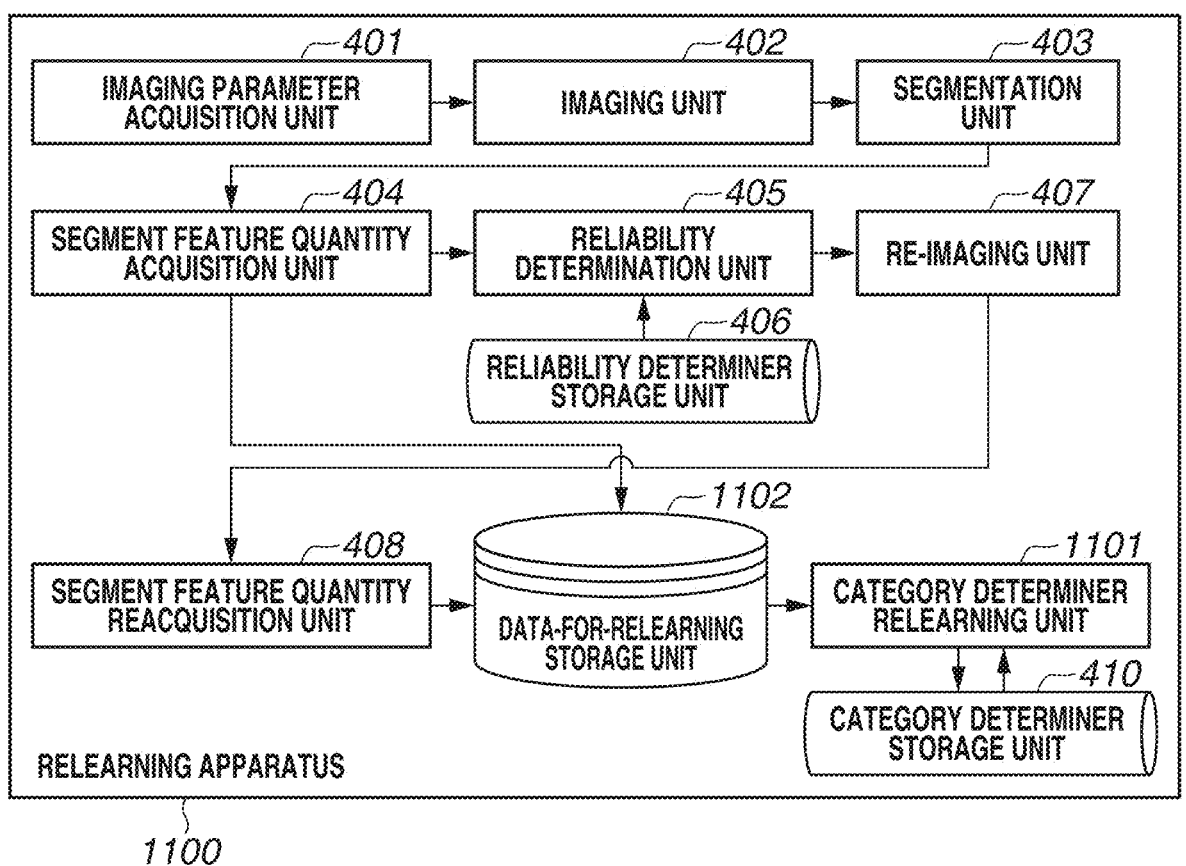
FIG. 11 is a block diagram illustrating a functional configuration of a relearning apparatus according to a first modification of the first exemplary embodiment.

FIG. 11 is a block diagram illustrating a functional configuration of a relearning apparatus 1100 according to the present modification. The relearning apparatus 1100 includes the imaging parameter acquisition unit 401, the imaging unit 402, and the segmentation unit 403 in the functional configuration (FIG. 4A) of the image recognition apparatus 200 according to the first exemplary embodiment. The relearning apparatus 1100 further includes a category determiner relearning unit 1101 in addition to the segment feature quantity acquisition unit 404, the reliability determination unit 405, the re-imaging unit 407, and the segment feature quantity reacquisition unit 408. The relearning apparatus 1100 further includes the reliability determiner storage unit 406, the category determiner storage unit 410, and a data-for-relearning storage unit 1102 as storage units.

Of these units, the imaging parameter acquisition unit 401, the imaging unit 402, and the segmentation unit 403 respectively are identical to the imaging parameter acquisition unit 401, the imaging unit 402, and the segmentation unit 403 of the image recognition apparatus 200 according to the first exemplary embodiment. Further, the feature quantity acquisition unit 404, the reliability determination unit 405, the re-imaging unit 407, and the segment feature quantity reacquisition unit 408 respectively are identical to the segment feature quantity acquisition unit 404, the reliability determination unit 405, the re-imaging unit 407, and the segment feature quantity reacquisition unit 408 according to the first exemplary embodiment. Detailed descriptions of these function units will be omitted. The relearning apparatus 1100 according to the present modification may be configured as an apparatus identical to the image recognition apparatus 200 or as an apparatus different therefrom.

Figure 12:
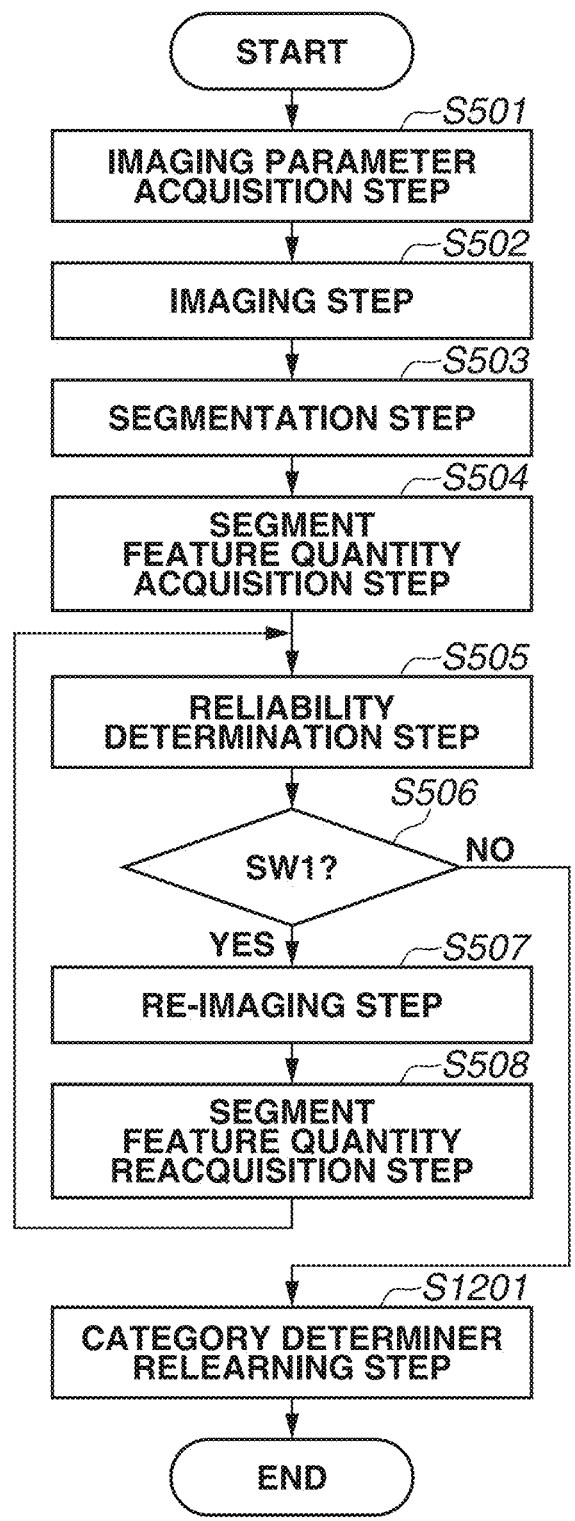
FIG. 12 is a flowchart illustrating relearning processing according to the first modification of the first exemplary embodiment.

Other function units included in the relearning apparatus 1100 will be described in detail below with reference to FIG. 12. FIG. 12 is a flowchart illustrating processing related to relearning according to the present modification. The overview of each step and the function of each function unit illustrated in FIG. 11 will be described below.

Referring to FIG. 12, the imaging parameter acquisition step S501, the imaging step S502, and the segmentation step S503 perform similar processing to the corresponding steps in the recognition processing according to the first exemplary embodiment, and detailed descriptions thereof will be omitted. Further, the segment feature quantity acquisition step S504, the reliability determination step S505, the re-imaging step S507, and the segment feature quantity reacquisition step S508 perform similar processing to the corresponding steps in the recognition processing according to the first exemplary embodiment, and detailed descriptions thereof will be omitted.

In a category determiner relearning step S1201, the category determiner relearning unit 1101 performs relearning of the category determiner by using the data for relearning stored in the data-for-relearning storage unit 1102. Then, the category determiner relearning unit 1101 stores the category determiner that has completed relearning in the category determiner storage unit 410.

The following describes in more detail the processing in the category determiner relearning step S1201 and processing before and after the step S1202 in the flowchart illustrated in FIG. 12. In the segment feature quantity acquisition step S504 and the segment feature quantity reacquisition step S508 in the relearning apparatus 1100, the segment feature quantity acquisition unit 404 and the segment feature quantity reacquisition unit 408 store the acquired segment feature quantities in the data-for-relearning storage unit 1102. The data-for-relearning storage unit 1102 further stores the segment GT in addition to the segment feature quantities.

In the category determiner relearning step S1201, the category determiner relearning unit 1101 performs relearning of the category determiner. According to the present modification, the category determiner that has completed learning in a similar way to the first exemplary embodiment is stored in the category determiner storage unit 410. In this step, the category determiner relearning unit 1101 performs relearning by using the category determiner as an initial value.

More specifically, when using Logistic Regression as a classifier of the category determiner, the coefficient of Logistic Regression is stored in the category determiner storage unit 410. In this step, using the coefficient as an initial value, optimization may be applied based on Stochastic Gradient Descent by using the learning data of the segment GT and the feature quantities. In addition to performing relearning in an additional learning framework in this way, the category determiner relearning unit 1101 may perform relearning of the classifier from the beginning by using the learning data.

As described above, according to the present modification, it is possible to perform relearning of the category determiner based on the learning data having the same population distribution as the data in the recognition processing, thus improving the recognition accuracy.

Second Modification of First Exemplary Embodiment

According to the first exemplary embodiment, the imaging parameters related to exposure in re-imaging is determined by storing them as an AE evaluation value map (BV map) or by performing re-photometry. However, even without performing re-photometry, suitable imaging parameters can be estimated based on the feature quantities of the local field subjected to re-imaging. In the present modification, a method for directly estimating optimal imaging parameters of the re-imaging target field based on the feature quantities of a local field without performing re-photometry will be described below.

FIG. 4B illustrates an example of a functional configuration of the image recognition apparatus 200 according to the present modification. The image recognition apparatus 200 according to the present modification includes the imaging parameter acquisition unit 401, the imaging unit 402, the segmentation unit 403, the segment feature quantity acquisition unit 404, the reliability determination unit 405, and an imaging parameter estimation unit 411. The image recognition apparatus 200 further includes the re-imaging unit 407, the segment feature quantity reacquisition unit 408, and the category determination unit 409.

Of these units, the imaging parameter acquisition unit 401, the imaging unit 402, the segmentation unit 403, the segment feature quantity acquisition unit 404, and the reliability determination unit 405 are similar to the corresponding function units according to the first exemplary embodiment. The re-imaging unit 407, the segment feature quantity reacquisition unit 408, and the category determination unit 409 have similar functions to the re-imaging unit 407, the segment feature quantity reacquisition unit 408, and the category determination unit 409, respectively, according to the first exemplary embodiment, and detailed descriptions will be omitted.

Further, the image recognition apparatus 200 according to the present modification includes the reliability determiner storage unit 406, the imaging parameter estimator storage unit 412, and the category determiner storage unit 410 as storage units. These functions included in the image recognition apparatus 200 will be described in detail below with reference to FIG. 5B.

FIG. 5B is a flowchart illustrating an example of recognition processing according to the present modification. The imaging parameter acquisition step S501, the imaging step S502, the segmentation step S503, the segment feature quantity acquisition step S504, and the reliability determination step S505 perform similar processing to the corresponding steps in the recognition processing according to the first exemplary embodiment, and detailed descriptions thereof will be omitted.

In an imaging parameter estimation step S510, the imaging parameter estimation unit 411 estimates optimal imaging parameters of a segment based on the segment feature quantities. In the re-imaging step S507, the re-imaging unit 407 performs re-imaging by using the imaging parameters estimated in the previous step (imaging parameter estimation step S510). The re-imaging step S507 performs similar processing to the re-imaging step S507 in the recognition processing according to the first exemplary embodiment, except for a part of processing, and a detailed description thereof will be omitted.

The segment feature quantity reacquisition step S508 and the category determination step S509 perform similar processing to the segment feature quantity reacquisition step S508 and the category determination step S509 in the recognition processing according to the first exemplary embodiment, and detailed descriptions thereof will be omitted.

The following describes in more detail the processing of the imaging parameter estimation step S510 and processing before and after the step S510 in the flowchart illustrated in FIG. 5B. Similar to the recognition processing according to the first exemplary embodiment, the reliability determination unit 405 determines the reliability based on the segment feature quantities in the reliability determination step S505. When there is a low-reliability field (YES in the branch SW1 step S506), the processing proceeds to the imaging parameter estimation step S510 and subsequent steps.

In the imaging parameter estimation step S510, the imaging parameter estimation unit 411 estimates an optimal exposure value EV by using the imaging parameter estimator based on the segment feature quantities. The segment feature quantities used in this case are similar to the segment feature quantities used in the reliability determination step S505. Learning of the imaging parameter estimator will be described below in the description of the learning processing.

In the re-imaging step S507, the re-imaging unit 407 determines the diaphragm value and the shutter speed based on the EV in the low-reliability field estimated in the previous step (imaging parameter estimation step S510) and then performs re-imaging. Other processing is similar to other processing according to the first exemplary embodiment, and redundant descriptions thereof will be omitted.

The recognition processing according to the present modification has been described in detail above. The following describes the learning method in the imaging parameter estimation step S510 according to the present modification.

FIG. 9B is a block diagram illustrating a functional configuration of the learning apparatus 900 according to the present modification. The learning apparatus 900 includes the segmentation unit 901, the segment feature quantity acquisition unit 902, the K-segmentation unit 903, the category determiner learning unit 904, the category determiner validation unit 905, the reliability determiner learning unit 906, and an imaging parameter estimator learning unit 912. Of these units, the segmentation unit 901, the K-segmentation unit 903, the category determiner validation unit 905, and the reliability determiner learning unit 906 have similar functions to the corresponding function units according to the first exemplary embodiment, and detailed descriptions thereof will be omitted. The learning apparatus 900 includes the data-for-learning storage unit 907, the category determiner data-for-learning storage unit 908, the category determiner storage unit 909, the reliability determiner data-for-learning storage unit 910, the reliability determiner storage unit 911, and an imaging parameter estimator storage unit 913 as storage units.

FIG. 10B is a flowchart illustrating learning-related processing according to the present modification. The overview of each step and the function of each function unit in FIG. 9B will be described below.

In the segmentation step S1001, on the image captured with typical imaging parameters out of images of the same subject captured with a plurality of imaging parameters, the segmentation unit 901 performs similar processing to the segmentation step S1001 in the learning processing according to the first exemplary embodiment. In the segment feature quantity acquisition step S1002, with respect to images of the same subject captured with a plurality of imaging parameters, the segment feature quantity acquisition unit 902 generates the segment feature quantities by using the segmentation result generated in the previous step (segmentation step S1001). The method for generating the segment feature quantities is similar to that in the segment feature quantity acquisition step S1002 in the learning processing according to the first exemplary embodiment.

In the K-segmentation step S1003, on the image captured with typical imaging parameters out of images of the same subject captured with a plurality of imaging parameters, the K-segmentation unit 903 performs similar processing to the K-segmentation step S1003 in the learning processing according to the first exemplary embodiment. In the category determiner learning step S1004, the category determiner learning unit 904 performs learning of the category determiner by using the segment feature quantities generated based on the image captured with typical imaging parameters out of images of the same subject captured with a plurality of imaging parameters. The method for performing learning of the category determiner is similar to that in the category determiner learning step S1004 according to the first exemplary embodiment.

In the category determiner validation step S1005, the category determiner validation unit 905 performs category determination by using the segment feature quantities corresponding to the images captured with respective imaging parameters out of images of the same subject captured with a plurality of imaging parameters. The method for category determination is similar to that in the category determiner validation step S1005 in the learning processing according to the first exemplary embodiment. In the reliability determiner learning step S1006, the reliability determiner learning unit 906 performs learning of the reliability determiner by using the segment feature quantities generated based on the image captured with typical imaging parameters out of images of the same subject captured with a plurality of imaging parameters. The method for performing learning of the reliability determiner is similar to that in the reliability determiner learning step S1006 in the learning processing according to the first exemplary embodiment.

In the imaging parameter estimator learning step S1007, the imaging parameter estimator learning unit 912 performs learning of the imaging parameter estimator for images of the same subject captured with a plurality of imaging parameters. The imaging parameter estimator learning unit 912 can perform learning of the imaging parameter estimator through regression learning by using as teacher values the imaging parameters for maximizing the category determination score. In regression learning, the imaging parameter estimator learning unit 912 uses the segment feature quantities generated based on the image captured with typical imaging parameters and uses results with respective conditions in the category determiner validation step S1005.

Differences in the learning processing from that according to the first exemplary embodiment will be described below with reference to the flowchart illustrated in FIG. 10B. The data-for-learning storage unit 907 of the learning apparatus 900 according to the present modification stores images of the same subject captured with a plurality of imaging parameters and meta data. The following describes an example of estimating an optimal exposure value based on the feature quantities. Therefore, the data-for-learning storage unit 907 stores the image captured with proper exposure (±0) and images captured with corrected exposures in four steps in each of the negative and positive directions (−2.0, −1.5, −1.0, −0.5, +0.5, +1.0, +1.5, and +2.0), i.e., nine different patterns of images.

In the segmentation step S1001, on the image captured with proper exposure out of images captured with the above-described imaging conditions, the segmentation unit 901 performs similar processing to the segmentation step S1001 in the learning processing according to the first exemplary embodiment to obtain a segmentation result.

In the segment feature quantity acquisition step S1002, with respect to all of the images captured with the above-described imaging conditions, the segment feature quantity acquisition unit 902 acquires segmentation feature quantities for each condition by using the segmentation result generated in the previous step (segmentation step S1001). The feature quantities to be acquired may be similar to those in the segment feature quantity acquisition step S1002 in the learning processing according to the first exemplary embodiment. The segment feature quantity acquisition unit 902 assigns a GT for each segment as with the segment feature quantity acquisition step S1002 in the learning processing according to the first exemplary embodiment.

In the K-segmentation step S1003, the K-segmentation unit 903 performs K-segmentation on a set of images for learning by applying K-Fold Cross Validation as with the learning processing according to the first exemplary embodiment. In this case, the K-segmentation unit 903 segments the set into K subsets by handling images of the same subject captured with changed imaging parameters as one image.

In the category determiner learning step S1004, the category determiner learning unit 904 performs learning of the category determiner by using the segment feature quantities and segment GT acquired for the image captured with proper exposure out of images captured with the above-described imaging conditions as with the category determiner learning step S1004 in the learning processing according to the first exemplary embodiment.

In the category determiner validation step S1005, for each imaging condition, the category determiner validation unit 905 evaluates category determination by using the segment feature quantities acquired based on images captured with the above-described imaging conditions as with the category determiner validation step S1005 in the learning processing according to the first exemplary embodiment.

In the reliability determiner learning step S1006, with respect to the image captured with proper exposure out of images captured with the above-described imaging conditions, the reliability determiner learning unit 906 performs learning of the reliability determiner for determining the reliability for each segment by using the segment feature quantities, the category determination result for each segment evaluated in the category determiner validation step S1005, and the segment GT. The method for performing learning of the reliability determiner is similar to that in the reliability determiner learning step S1006 in the learning processing according to the first exemplary embodiment.

In the imaging parameter estimator learning step S1007, the imaging parameter estimator learning unit 912 performs learning of the imaging parameter estimator. The imaging parameter estimator learning unit 912 can acquire, for each segment, imaging conditions which provides a correct category determination result and the highest category determination score, based on the category determination score related to the segment feature quantities for the above-described imaging conditions evaluated in the category determiner validation step S1005, and the corresponding segment GT.

For example, consider segments (SPs) in the entire image, supplied with an identifier (ID) of 1, 2, 3, . . . , N as a serial number (ID). For each SP, the imaging parameter estimator learning unit 912 obtains a category determination result (score and validity) for nine different patterns of the feature quantities under corrected exposure conditions (−2.0, −1.5, −1.0, −0.5, ±0, +0.5, +1.0, +1.5, and +2.0). From among these imaging conditions, the imaging parameter estimator learning unit 912 obtains an imaging condition (exposure correction amount) which provides the correct answer and the highest score. This enables acquiring a pair of the feature quantity for proper exposure (±0) and the optimal exposure correction amount with respect to SPs where the correct answer exists out of results for respective exposure conditions. As an example, a list illustrated in the following Table 1 can be acquired.

TABLE 1

| SP | Feature quantity | Optimal exposure correction amount |
|---|---|---|
| 1 | A | +0.5 |
| 2 | B | +1.5 |
| 3 | C | −0.5 |
| . | . | . |
| . | . | . |
| . | . | . |
| N | ZZ | +2 |

Using this list, the imaging parameter estimator learning unit 912 performs regression analysis by using the optimal exposure correction amount as a target variable and the feature quantity as an explanatory variable. Although Linear Regression or Support Vector Regression (SVR) are used for regression analysis, the method to be used is not particularly limited. Imaging parameter estimation is performed by applying a predetermined function involved in the regression analysis acquired in this case to data for evaluation in the recognition processing. According to the present modification, the imaging parameter estimator learning unit 912 uses this predetermined function as the imaging parameter estimator and transmits to the imaging parameter estimator storage unit 913 the imaging parameter estimator that has completed learning.

As described above, according to the present modification, it becomes possible to estimate suitable imaging parameters based on the feature quantities of a local field subjected to re-imaging.

Third Modification of First Exemplary Embodiment

In the first exemplary embodiment, a method for improving the category accuracy by setting the imaging parameters for a field with low reliability of category determination by using an image captured with the imaging parameter related to exposure set with AE and then performing re-imaging has been described above. A subject normally changes from frame to frame. Therefore, if imaging is continuously repeated, it becomes difficult to apply segments acquired in the initial frame to the image after several frames. Therefore, the present modification adds motion compensation for each frame. More specifically, the present modification continuously repeats motion compensation in the imaging preparation operation and performs image acquisition, imaging parameter adjustment and category determination for low-reliability fields. This enables using a high-accuracy Semantic Segmentation result in image processing in the frame for starting an imaging operation.

Figure 13A:
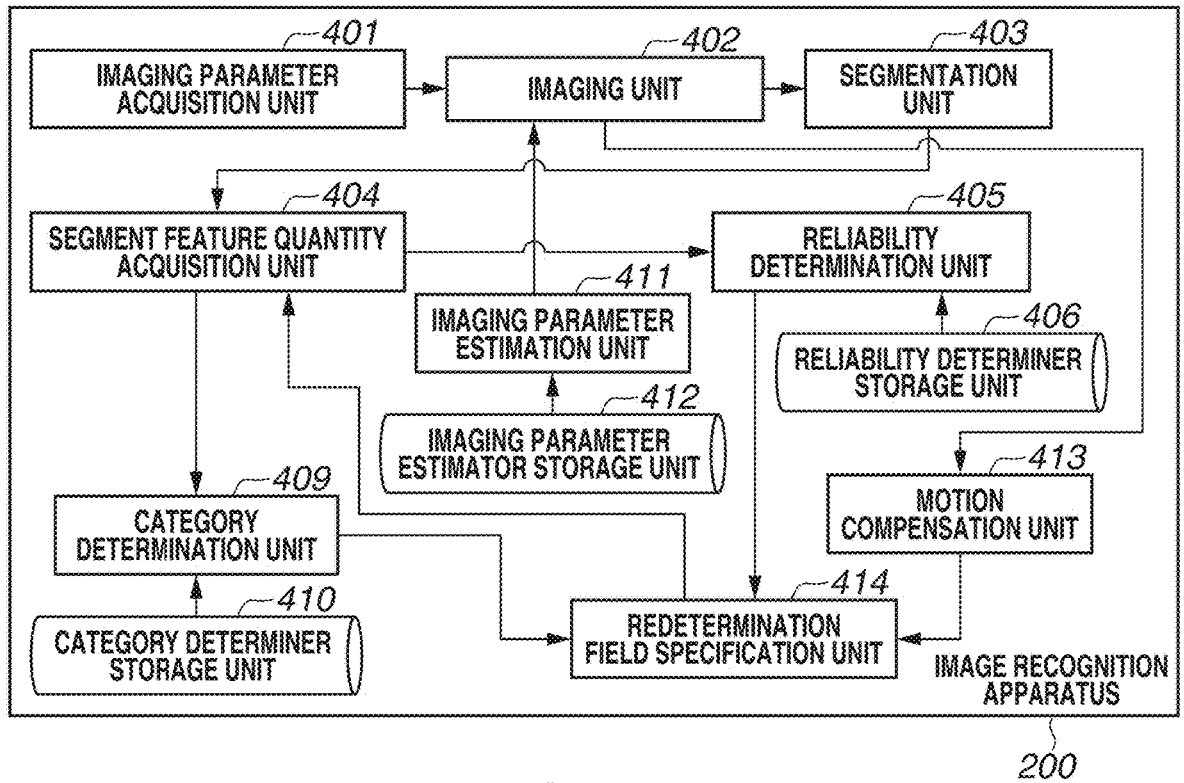
FIGS. 13A and 13B are block diagrams illustrating other functional configurations of the image recognition apparatus according to each exemplary embodiment.
Figure 13B:
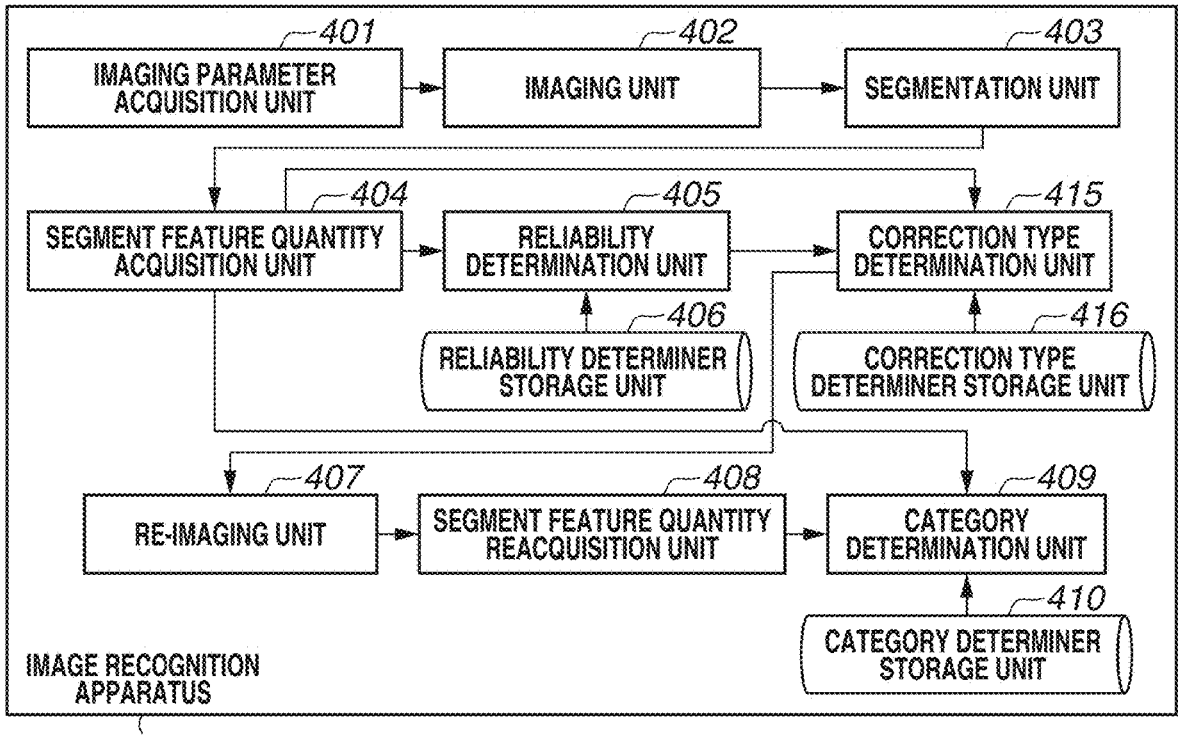

FIGS. 13A and 13B are block diagrams illustrating functional configurations of the image recognition apparatus 200 according to each exemplary embodiment. FIG. 13A is a block diagram illustrating a functional configuration of the image recognition apparatus 200 according to the present modification. The image recognition apparatus 200 includes the imaging parameter acquisition unit 401, the imaging unit 402, the segmentation unit 403, the segment feature quantity acquisition unit 404, the reliability determination unit 405, the imaging parameter estimation unit 411, a motion compensation unit 413, a redetermination field specification unit 414, and the category determination unit 409.

Of these units, the imaging parameter acquisition unit 401, the imaging unit 402, the segmentation unit 403, the segment feature quantity acquisition unit 404, the reliability determination unit 405, and the category determination unit 409 have similar functions to the corresponding function units according to the first exemplary embodiment, and detailed descriptions thereof will be omitted. The imaging parameter estimation unit 411 has a similar function to the imaging parameter estimation unit 411 in the recognition processing according to the second modification, and a detailed description thereof will be omitted.

Further, the image recognition apparatus 200 according to the present modification includes the reliability determiner storage unit 406, the imaging parameter estimator storage unit 412, and the category determiner storage unit 410 as storage units.

FIGS. 14A and 14B are flowcharts illustrating the recognition processing according to each exemplary embodiment. FIG. 14A is a flowchart illustrating the recognition processing according to the present modification. The imaging parameter acquisition step S501 performs similar processing to the imaging parameter acquisition step S501 in the recognition processing according to the first exemplary embodiment, and a detailed description thereof will be omitted.

In the processing in the initial frame, the imaging step S502 performs similar processing to the imaging step S502 in the recognition processing according to the first exemplary embodiment. In subsequent processing after the initial frame, when the optimal exposure correction amount is acquired in the imaging parameter estimation step S510 (described below), the imaging unit 402 captures an image with the exposure correction amount.

In a branch SW2 step S521, the processor 207 determines whether the current frame is the initial frame. When the current frame is the initial frame (YES in step S521), the processing proceeds to the segmentation step S503. The segmentation step S503 performs similar processing to the segmentation step S503 in the recognition processing according to the first exemplary embodiment, and a detailed description thereof will be omitted. In the processing in the initial frame, the segment feature quantity acquisition step S504 performs similar processing to the segment feature quantity acquisition step S504 in the recognition processing according to the first exemplary embodiment. In processing after the initial frame, segments for acquiring the segment feature quantities are limited to segments having a motion and low reliability specified in a redetermination field specification step S512 (described below).

The category determination step S509 performs similar processing to the category determination step S509 in the recognition processing according to the first exemplary embodiment, and a detailed description thereof will be omitted. In a branch SW3 step S522, the processor 207 determines whether to shift from the imaging preparation operation to the imaging operation. When shifting to the imaging operation (YES in step S522), the processing exits this flowchart. On the other hand, when not shifting to the imaging operation (NO in step S522), the processing proceeds to the reliability determination step S505.

The reliability determination step S505 and the branch SW1 step S506 perform similar processing to the corresponding steps in the recognition processing according to the first exemplary embodiment, and detailed descriptions thereof will be omitted. The imaging parameter estimation step S510 performs similar processing to the imaging parameter estimation step S510 in the recognition processing according to the second modification, and a redundant description thereof will be omitted.

In a motion compensation step S511, the motion compensation unit 413 calculates a motion vector between a plurality of frames in each block, corrects the segment position by using the calculated motion vector, and then performs motion compensation on the category determination result. In the redetermination field specification step S512, the redetermination field specification unit 414 specifies a segment having a motion between frames and low reliability by using both the motion vector calculated in the motion compensation step S511 and the low-reliability field calculated in the reliability determination step S505.

The following describes in detail the processing according to the present modification with reference to the flowchart illustrated in FIG. 14A. As to processing similar to that according to the above-described exemplary embodiment, a redundant description will be omitted. Processing partially different from processing according to the above-described exemplary embodiment will be described below centering on the differences.

According to the present modification, in the first branch SW2 step S521, the processor 207 determines whether the current frame is the initial frame in the live view operation in the imaging preparation state. When the current frame is the initial frame (YES in step S521), the processing proceeds to the segmentation step S503 and the segment feature quantity acquisition step S504. Then, the processing proceeds to the category determination step S509 unlike the first exemplary embodiment.

In the following branch SW3 step S522, the processor 207 determines whether to end the imaging preparation operation and perform the imaging operation. When continuing the imaging preparation operation (NO in step S522), the processing proceeds to the reliability determination step S505. In a branch SW1 step S506, the processor 207 determines whether a low-reliability field exists. When a low-reliability segment exists (YES in step S506), the processing proceeds to the imaging parameter estimation step S510.

In the imaging parameter estimation step S510, the imaging parameter estimation unit 411 estimates optimal imaging parameters in a segment based on the segment feature quantities as with the processing in the imaging parameter estimation step S510 in the recognition processing according to the second modification. As an imaging parameter, the imaging parameter estimation unit 411 estimates an optimal exposure correction amount as with the second modification. When a plurality of low-reliability fields exists, priority is given to the field having the lowest reliability out of a plurality of low-reliability fields.

In the imaging step S502, the imaging unit 402 acquires an image with the imaging parameters (diaphragm and shutter speed) obtained by correcting with the exposure correction amount in the previous step. In processing after the initial frame, when the current frame is not the initial frame (NO in the following branch SW2 step S521), the processing proceeds to the motion compensation step S511.

In the motion compensation step S511, the motion compensation unit 413 calculates a motion vector between frames through block matching between the last frame and the frame acquired in the previous step (imaging step S502). An algorithm conforming to the Moving Picture Experts Group (MPEG) 4 moving image encoding standard is applied as block matching. However, other algorithms may be applied as a motion vector calculation algorithm. In this step, the motion compensation unit 413 corrects the segment position to the current frame by using this motion vector and performs motion compensation on the category determination result of the last frame by using the acquired motion vector.

In the redetermination field specification step S512, the redetermination field specification unit 414 acquires a field where has not been interpolated through motion compensation as a result of performing motion compensation on the category determination result by using the motion vector calculated in the motion compensation step S511. Then, the redetermination field specification unit 414 specifies as a redetermination field to be subjected to category redetermination the field satisfying both the low-reliability segment of the last frame determined in the reliability determination step S505 and the field which has not been interpolated through motion compensation.

In the segment feature quantity acquisition step S504, the segment feature quantity acquisition unit 404 reacquires the segment feature quantities for both the low-reliability segment and the field which has not been interpolated through motion compensation. The processor 207 performs the subsequent processing by limiting the processing target to the field with which the feature quantities have been reacquired.

As described above, in the redetermination field specification step S512, although the redetermination field specification unit 414 acquires the segment feature quantities and performs category redetermination on the field which has not been interpolated through motion compensation, the field which has not been interpolated through motion compensation may be simply interpolated with surrounding category determination results.

According to the present modification, it becomes possible to obtain a high-accuracy Semantic Segmentation result also in the frame for starting the imaging operation.

Fourth Modification of First Exemplary Embodiment

Although, in the first exemplary embodiment, the control item to be subjected to imaging parameter correction is limited to exposure, the image or feature quantities may be reacquired based on corrected focus and white balance. Since AWB control is a part of the development processing to be performed after image capturing, re-imaging is not required when performing AWB control again. The present modification will be described below on the premise that only re-execution of the development processing is also included in re-imaging.

When performing imaging parameter correction and re-imaging, which of the three control items (AE, AF, and AWB) is to be corrected to achieve a better result by using a certain method is to be determined. The present modification will be described below centering on an example of a method for determining which control item is to be corrected to achieve a better result by using a multi-class classifier.

FIG. 13B is a block diagram illustrating a functional configuration of the image recognition apparatus 200 according to the present modification. The image recognition apparatus 200 includes the imaging parameter acquisition unit 401, the imaging unit 402, the segmentation unit 403, the segment feature quantity acquisition unit 404, and the reliability determination unit 405. The image recognition apparatus 200 further includes a correction type determination unit 415, the re-imaging unit 407, the segment feature quantity reacquisition unit 408, and the category determination unit 409. Of these units, the imaging parameter acquisition unit 401, the imaging unit 402, the segmentation unit 403, the segment feature quantity acquisition unit 404, the reliability determination unit 405, the re-imaging unit 407, the segment feature quantity reacquisition unit 408, and the category determination unit 409 have similar functions to the corresponding function units according to the first exemplary embodiment. The image recognition apparatus 200 according to the present modification includes the reliability determiner storage unit 406, a correction item determiner storage unit 416, and the category determiner storage unit 410 as storage units.

FIG. 14B is a flowchart illustrating recognition processing according to the present modification. This flowchart according to the present modification differs from the flowchart according to the second modification of the first exemplary embodiment only in a correction type determination step S513.

In the correction type determination step S513, the correction type determination unit 415 determines a more suitable correction item from the segment feature quantities by using a correction type determiner stored in the correction type determiner storage unit 416. In the following re-imaging step S507, the re-imaging unit 407 acquires more suitable imaging parameters in a low-reliability field for the correction item determined in the previous step and performs re-imaging. Other processing is similar to other processing according to the second modification of the first exemplary embodiment, and redundant descriptions thereof will be omitted.

The recognition processing according to the present modification has been described in detail above. The following describes a method for performing learning of the correction type determiner in the correction type determination step S513 according to the present modification.

Figure 15A:
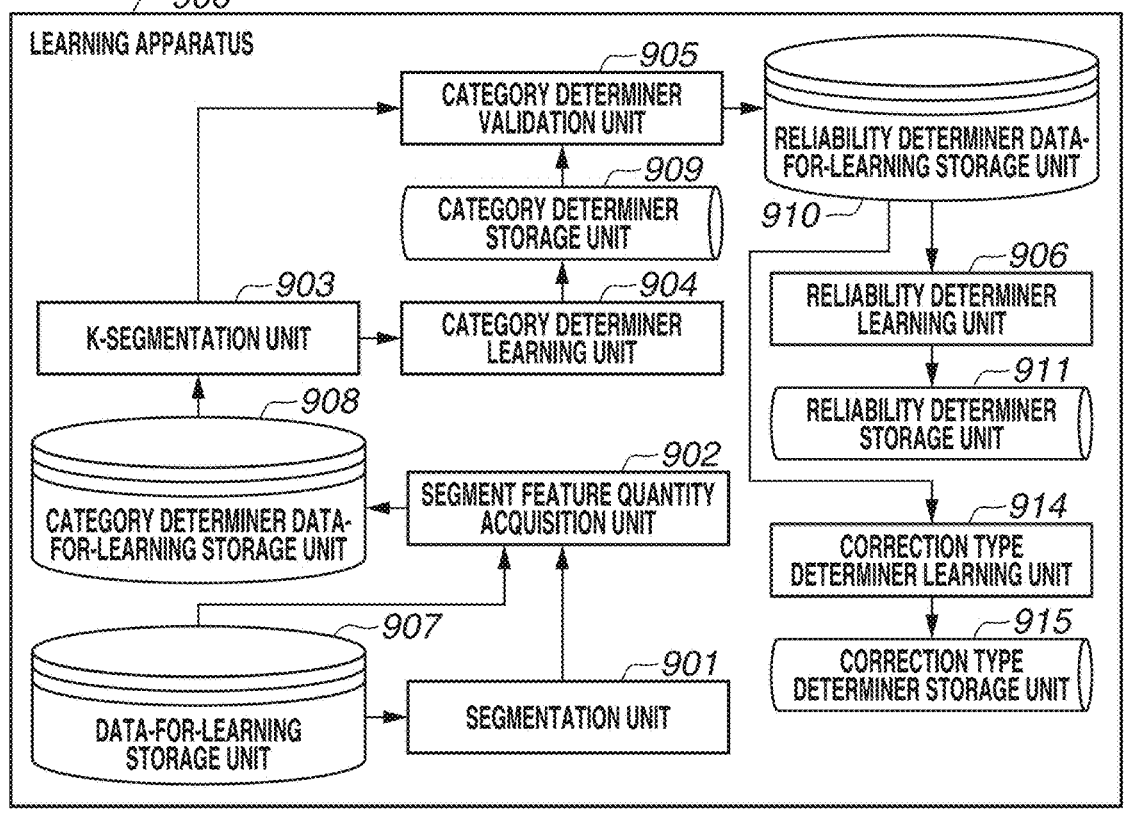
FIGS. 15A and 15B are block diagrams illustrating other functional configurations of the learning apparatus according to each exemplary embodiment.
Figure 15B:
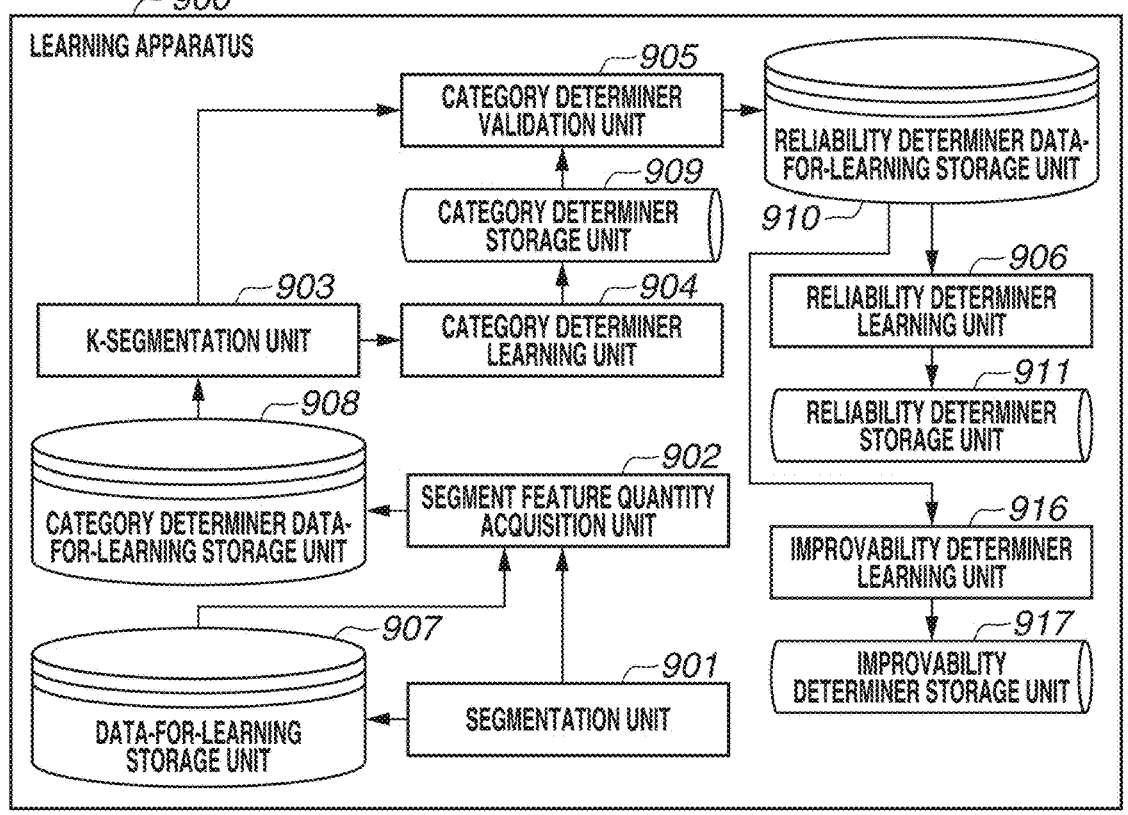

FIGS. 15A and 15B are block diagrams illustrating functional configurations of the learning apparatus 900 according to each exemplary embodiment. FIG. 15A is a block diagram according to the present modification. The learning apparatus 900 according to the present exemplary embodiment includes the segmentation unit 901, the segment feature quantity acquisition unit 902, the K-segmentation unit 903, the category determiner learning unit 904, the category determiner validation unit 905, the reliability determiner learning unit 906, and a correction type determiner learning unit 914. Of these units, the segmentation unit 901, the K-segmentation unit 903, the category determiner validation unit 905, and the reliability determiner learning unit 906 have similar functions to the corresponding function units of the learning apparatus 900 according to the first exemplary embodiment, and detailed descriptions thereof will be omitted. The learning apparatus 900 further includes the data-for-learning storage unit 907, the category determiner data-for-learning storage unit 908, the category determiner storage unit 909, the reliability determiner data-for-learning storage unit 910, the reliability determiner storage unit 911, and a correction type determiner storage unit 917 as storage units.

FIGS. 16A and 16B are flowcharts illustrating learning-related processing according to each exemplary embodiment. FIG. 16A is a flowchart illustrating learning processing according to the present modification. The learning processing according to the present modification differs from the learning processing according to the second modification of the first exemplary embodiment only in a correction type determiner learning step S1008.

Referring to FIG. 16A, in the correction type determiner learning step S1008, the correction type determiner learning unit 914 performs learning of a multi-class classifier for the segment of the learning data by using the learning data stored in the reliability determiner data-for-learning storage unit 910. Learning of the multi-class classifier is performed by using correction items with the improved category determination score as teacher values and using the segment feature quantities as feature quantities used for classification. The multi-class classifier is not particularly limited. More specifically, Random Forest and Neural Network as well as multi-class Logistic Regression and SVM are applicable to the multi-class classifier.

As described above, the present modification makes it possible to change the control items such as focus and white balance and perform reacquisition of the image or feature quantities.

A second exemplary embodiment will be described below. The first exemplary embodiment has been described above centering on a framework for improving the classification accuracy of a low-reliability field by calculating the reliability of category determination based on the feature quantities of a local field (segment feature quantities) of an image, optimizing the imaging parameters such as exposure to the low-reliability field, and performing re-imaging. More specifically, the first exemplary embodiment is based on a framework in which the cause of low reliability is implicitly limited to the imaging parameters. However, actually, the fallibility may not be corrected by locally optimizing the imaging parameters because of similar feature quantities of local fields. For example, a flat wall surface of a white building and cloudy sky are both in non-texture white color (colorless). In this case, it is difficult to distinguish between the two objects with high accuracy even after optimizing the imaging parameters by using only the feature quantities only in segments like SPs acquired from an RGB image.

Accordingly, the second exemplary embodiment of the present disclosure determines a low-reliability field, determines the improvability through re-imaging, re-images a field having low reliability and improvability through re-imaging, and, for a low-reliability field that is not corrected through re-imaging, selects category determination with other feature quantities. This makes it possible to accurately perform field determination (category determination) on both a low-reliability field with unsuitable imaging parameters as described above and a field originally difficult to classify based on local RGB image feature quantities. The second exemplary embodiment of the present disclosure will be described below. The same reference numerals are assigned to components which have been described above as components according to the first exemplary embodiment, and descriptions thereof will be omitted.

Figure 17:
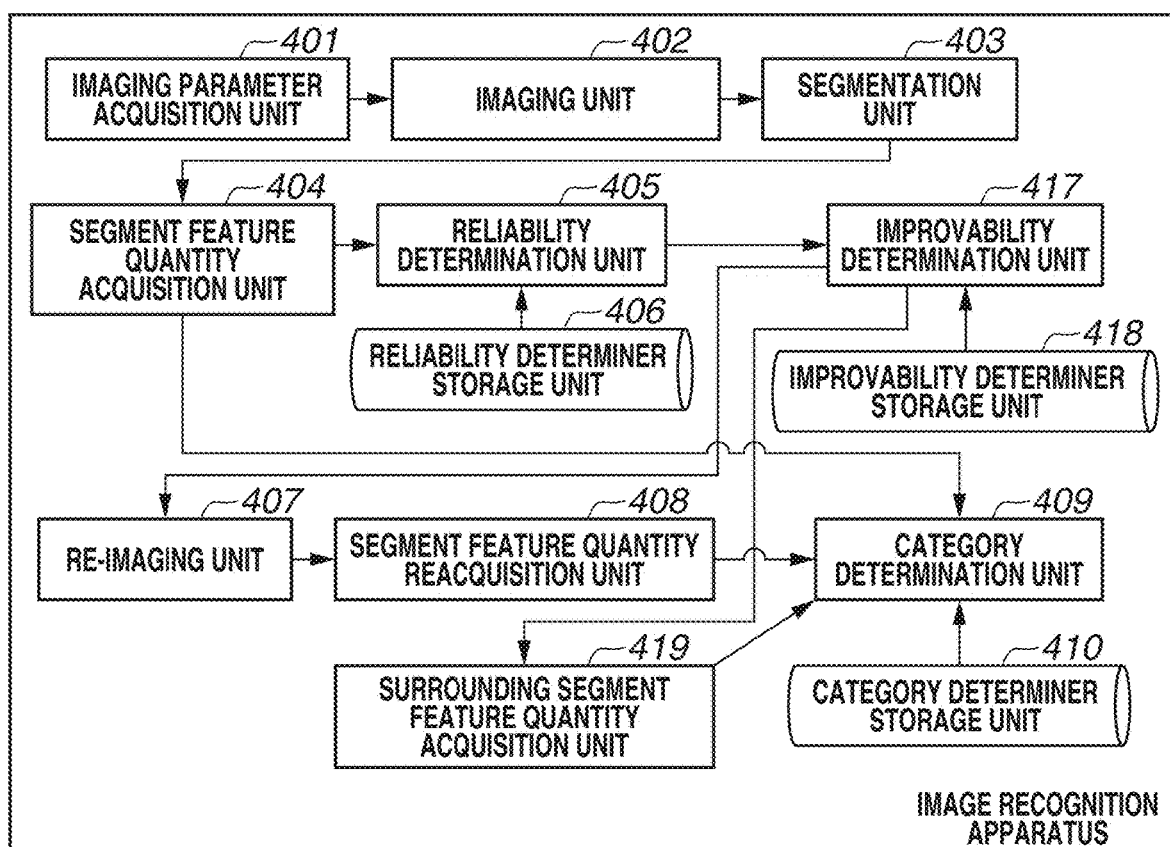
FIG. 17 is a block diagram illustrating a functional configuration of an image recognition apparatus according to a second exemplary embodiment.

FIG. 17 is a block diagram illustrating a functional configuration of the image recognition apparatus 200 according to the present exemplary embodiment. The image processing apparatus 200 according to the present exemplary embodiment includes the imaging parameter acquisition unit 401, the imaging unit 402, the segmentation unit 403, the segment feature quantity acquisition unit 404, the reliability determination unit 405, the re-imaging unit 407, the segment feature quantity reacquisition unit 408, and the category determination unit 409. The image processing apparatus 200 further includes an improvability determination unit 417 and a surrounding segment feature quantity acquisition unit 419. Of these units, the imaging parameter acquisition unit 401, the imaging unit 402, the segmentation unit 403, the segment feature quantity acquisition unit 404, the reliability determination unit 405, the re-imaging unit 407, and the segment feature quantity reacquisition unit 408 have similar functions to the corresponding function units according to the first exemplary embodiment. The image recognition apparatus 200 includes the reliability determiner storage unit 406, the category determiner storage unit 410, and an improvability determiner storage unit 418 as storage units. Each function unit included in the image recognition apparatus 200 will be described in detail below with reference to FIG. 18.

Figure 18:
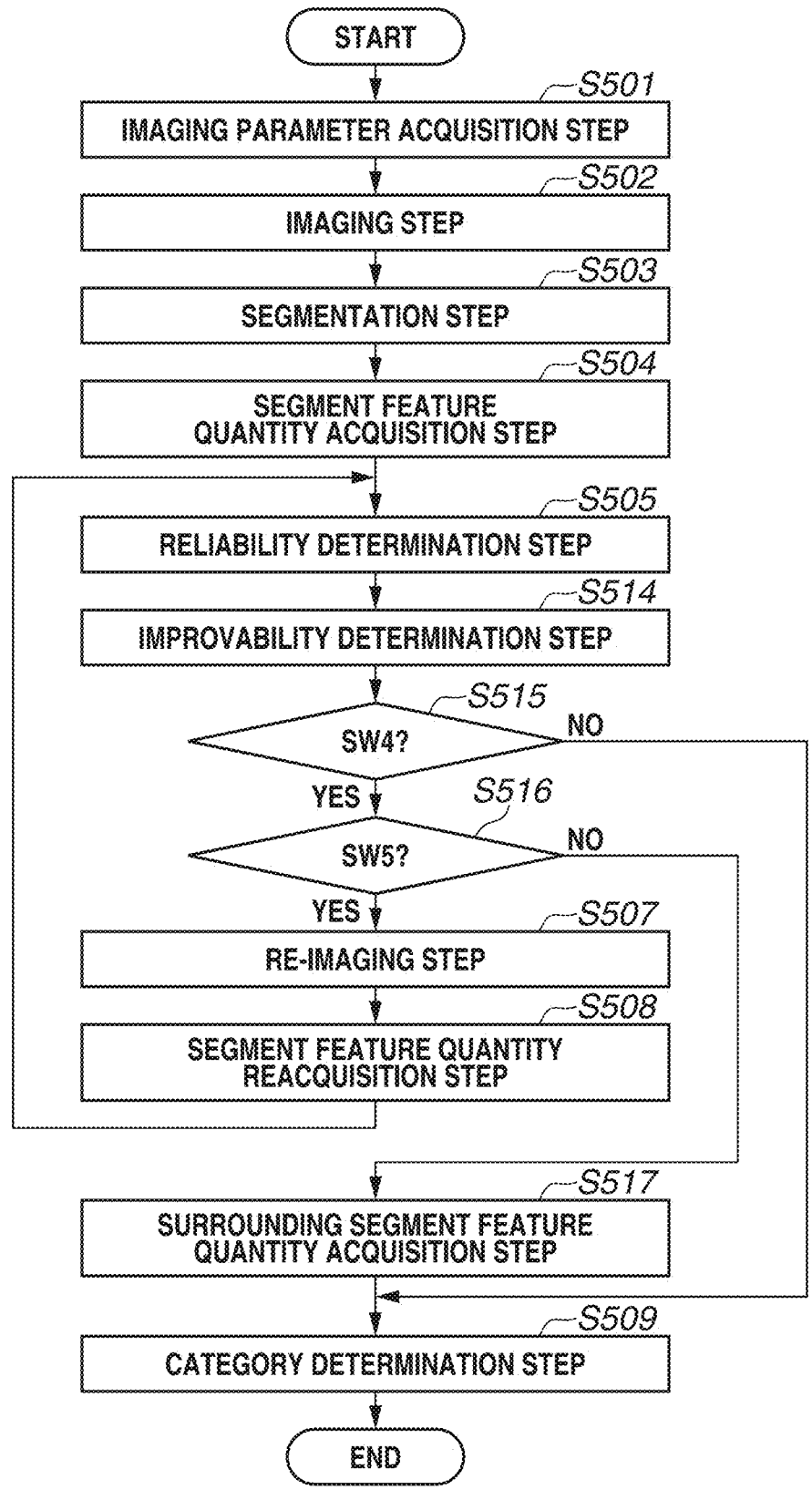
FIG. 18 is a flowchart illustrating recognition processing in the image recognition apparatus according to the second exemplary embodiment.

FIG. 18 is a flowchart illustrating recognition processing by the image recognition apparatus 200 according to the present exemplary embodiment. The imaging parameter acquisition step S501, the imaging step S502, and the segmentation step S503 perform similar processing to the corresponding steps in the recognition processing according to the first exemplary embodiment, and detailed descriptions thereof will be omitted. Further, the segment feature quantity acquisition step S504 and the reliability determination step S505 perform similar processing to the corresponding steps in the recognition processing according to the first exemplary embodiment, and detailed descriptions thereof will be omitted.

In an improvability determination step S514, the improvability determination unit 417 determines the improvability in re-imaging based on the segment feature quantities by using the improvability determiner stored in the improvability determiner storage unit 418. The segment feature quantity reacquisition step S508 performs similar processing to the segment feature quantity reacquisition step S508 in the recognition processing according to the first exemplary embodiment, and a detailed description thereof will be omitted.

A surrounding segment feature quantity acquisition step S517 acquires the feature quantities also from the circumference of a segment to correct a field where the field category determination accuracy does not improve through re-imaging. The category determination step S509 performs basically similar processing to (and partially different processing from) the category determination step S509 in the recognition processing according to the first exemplary embodiment. The difference in processing will be described below.

The following describes in more detail the improvability determination step S514, a branch SW4 step S515, a branch SW5 step S516, the surrounding segment feature quantity acquisition step S517, and the category determination step S509 in the flowchart illustrated in FIG. 18.

In the improvability determination step S514, the improvability determination unit 417 determines whether the category determination accuracy of the segment is to be improved through the optimization of the imaging parameters and re-imaging based on the segment feature quantities acquired in the segment feature quantity acquisition step S504. In this case, similar to the reliability determination step S505, the improvability determination unit 417 classifies the learning data into a cluster which is easy to improve through clustering and a cluster which is hard to improve through clustering and investigates the attribution of the segment feature quantities to each cluster to determine whether the segment is easy to improve. The score is assigned to the improvability by using the score of the category determination result of learning samples in a cluster. Learning and scoring for a cluster will be described in detail below in the description of the learning processing.

Then, the processing proceeds to the branch SW4 step S515. In step S515, the improvability determination unit 417 determines whether the segment reliability is lower than a threshold value based on the result of the reliability determination step S505. The threshold value in the branch step is optimized by using the cross-validation method as described in the first exemplary embodiment, the method of optimization is not particularly limited in the present exemplary embodiment.

Then, the processing proceeds to the branch SW5 step S516. In step S516, the improvability determination unit 417 determines the improvability of the segment, i.e., determines whether the improvability score of the segment is higher than the threshold value. When the improvability score is higher than the threshold value (YES in step S516), the category determination accuracy is expected to improve by optimizing the imaging parameters, and the processing proceeds to the re-imaging step S507. Similar to the branch step S515, the cross-validation method may be used to optimize the threshold value.

When a segment has low reliability and low improvability, the processing proceeds to the surrounding segment feature quantity acquisition step S517 via the branch SW4 step S515 and the branch SW5 step S516. The field corresponding to this branch step has low reliability of category determination and low improvability of the category determination accuracy through re-imaging. Therefore, the improvability determination unit 417 acquires new feature quantities in addition to the segment feature quantities acquired in the segment feature quantity acquisition step S504. In the present exemplary embodiment, as the feature quantities, the feature quantities of the image and the evaluation value map are acquired also from surrounding fields of the segment.

Although, in the present exemplary embodiment, the feature quantities from surrounding fields are handled as new feature quantities, new feature quantities are not limited thereto. For example, new feature quantities may be acquired for an image illuminated by using a flashing function of an imaging apparatus such as a digital camera. If the imaging apparatus mounts an infrared (IR) image sensor or an image sensor having polarizing filters, new feature quantities may be acquired from data of these sensors in this step.

In the category determination step S509, the category determination unit 409 performs category determination based on the feature quantities acquired in the segment feature quantity acquisition step S504 and the surrounding segment feature quantity acquisition step S517. According to the present exemplary embodiment, since the feature quantities differ for each segment, the category determination unit 409 changes the category determiner according to the type of feature quantity. Similar to the category determiner learning step S1004 in the learning processing according to the first exemplary embodiment, learning of the category determiner according to the type of feature quantity is performed.

The recognition processing according to the second exemplary embodiment has been described in detail above. The following describes a method for performing learning of the improvability determiner and the category determiner used in the improvability determination step S514 and the category determination step S509, respectively, according to the present exemplary embodiment.

FIG. 15B is a block diagram illustrating a functional configuration of the learning apparatus 900 according to the present exemplary embodiment. The learning apparatus 900 includes the segmentation unit 901, the segment feature quantity acquisition unit 902, the K-segmentation unit 903, the category determiner learning unit 904, the category determiner validation unit 905, the reliability determiner learning unit 906, and an improvability determiner learning unit 916. Of these units, the segmentation unit 901, the K-segmentation unit 903, the category determiner validation unit 905, and the reliability determiner learning unit 906 have similar functions to the corresponding function units according to the first exemplary embodiment, and detailed descriptions thereof will be omitted. The learning apparatus 900 further includes has the data-for-learning storage unit 907, the category determiner data-for-learning storage unit 908, the category determiner storage unit 909, the reliability determiner data-for-learning storage unit 910, the reliability determiner storage unit 911, and the improvability determiner storage unit 917 as storage units.

FIG. 16B is a flowchart illustrating learning-related processing according to the present exemplary embodiment. The overview of each step and the function of each function unit in FIG. 15B will be described below.

In the segmentation step S1001, on the image captured with typical imaging parameters out of images of the same subject captured with a plurality of imaging parameters, the segmentation unit 901 performs similar processing to the segmentation step S1001 in the learning processing according to the first exemplary embodiment. In the segment feature quantity acquisition step S1002, with respect to images of the same subject captured with a plurality of imaging parameters, the segment feature quantity acquisition unit 902 generates the segment feature quantities by using the segmentation result generated in the previous step (segmentation step S1001). The method for generating the segment feature quantities is similar to that in the segment feature quantity acquisition step S1002 in the learning processing according to the first exemplary embodiment.

In the K-segmentation step S1003, on the image captured with typical imaging parameters out of images of the same subject captured with a plurality of imaging parameters, the K-segmentation unit 903 performs similar processing to the K-segmentation step S1003 in the learning processing according to the first exemplary embodiment. In the category determiner learning step S1004, with respect to images of the same subject captured with a plurality of imaging parameters, the category determiner learning unit 904 performs learning of the category determiner by using the segment feature quantities generated based on the image captured with typical imaging parameters. Processing for performing learning of the category determiner is similar to that in the category determiner learning step S1004 in the learning processing according to the first exemplary embodiment.

In the category determiner validation step S1005, with respect to images of the same subject captured with a plurality of imaging parameters, the category determiner validation unit 905 performs category determination by using the segment feature quantities corresponding to the images captured with respective imaging parameters. The method of category determination is similar to that in the category determiner validation step S1005 in the learning processing according to the first exemplary embodiment. In the reliability determiner learning step S1006, with respect to images of the same subject captured with a plurality of imaging parameters, the reliability determiner learning unit 906 performs learning of the reliability determiner for determining the reliability for each segment, by using the segment feature quantities generated based on the image captured with typical imaging parameters. The method for performing learning of the reliability determiner is similar to that in the reliability determiner learning step S1006 in the learning processing according to the first exemplary embodiment.

In the improvability determiner learning step S1009, with respect to images of the same subject captured with a plurality of imaging parameters, the improvability determiner learning unit 916 performs learning of the improvability determiner for determining whether the result improves through exposure correction, based on 2-class determination. The improvability determiner learning unit 916 can perform learning of the improvability determiner based on results with respective conditions in the category determiner validation step S1005 by using the segment feature quantities generated based on the image captured with typical imaging parameters.

The following describes the difference of the learning processing according to the present exemplary embodiment from that according to the first exemplary embodiment with reference to the flowchart illustrated in FIG. 16B. The data-for-learning storage unit 907 of the learning apparatus 900 according to the present exemplary embodiment stores images of the same subject captured with a plurality of imaging parameters and meta data. The following describes an example of estimating an optimal exposure value based on the feature quantities. Therefore, the data-for-learning storage unit 907 stores the image captured with proper exposure (±0) and the images captured with corrected exposures in four steps in each of the negative and positive directions (−2.0, −1.5, −1.0, −0.5, +0.5, +1.0, +1.5, and +2.0), i.e., nine different patterns of images.

In the segmentation step S1001, on the image captured with proper exposure out of images captured with the above-described imaging conditions, the segmentation unit 901 performs similar processing to the segmentation step S1001 in the learning processing according to the first exemplary embodiment and obtains a segmentation result.

In the segment feature quantity acquisition step S1002, with respect to all of the images captured with the above-described imaging conditions, the segment feature quantity acquisition unit 902 acquires segmentation feature quantity for each condition by using the segmentation result generated in the previous step (segmentation step S1001). The feature quantities to be acquired may be similar to those in the segment feature quantity acquisition step S1002 in the learning processing according to the first exemplary embodiment. The segment feature quantity acquisition unit 902 assigns a GT for each segment as with the segment feature quantity acquisition step S1002 in the learning processing according to the first exemplary embodiment.

In the K-segmentation step S1003, the K-segmentation unit 903 performs K-segmentation on a set of images for learning as with the learning processing according to the first exemplary embodiment in order to apply K-Fold Cross Validation. In this case, the K-segmentation unit 903 segments the set into K subsets by handling images of the same subject captured with changed imaging parameters as one image.

In the category determiner learning step S1004, the category determiner learning unit 904 performs learning of the category determiner by using the segment feature quantities and segment GT acquired for the image captured with proper exposure out of images captured with the above-described imaging conditions as with the category determiner learning step S1004 according to the first exemplary embodiment.

In the category determiner validation step S1005, for each imaging condition, the category determiner validation unit 905 evaluates category determination by using the segment feature quantities acquired based on images captured with the above-described imaging conditions as with the category determiner validation step S1005 in the learning processing according to the first exemplary embodiment.

In the reliability determiner learning step S1006, with respect to the image captured with proper exposure out of images captured with the above-described imaging conditions, the reliability determiner learning unit 906 performs learning of the reliability determiner by using the segment feature quantities, the category determination result for each segment evaluated in the category determiner validation step S1005, and the segment GT. The method for performing learning of the reliability determiner is similar to that in the reliability determiner learning step S1006 in the learning processing according to the first exemplary embodiment.

In the improvability determiner learning step S1009, the improvability determiner learning unit 916 performs learning of the imaging parameter estimator. As to the category determination result for the segment feature quantities under the above-described imaging conditions evaluated in the category determiner validation step S1005, the improvability determiner learning unit 916 compares the result for proper exposure with the result for other imaging conditions. Then, the improvability determiner learning unit 916 supplies positive and negative labels regarding the improvability for each segment depending on whether the category determination score has improved.

The improvability determiner learning unit 916 performs learning of a 2-class determiner by using the segment feature quantities for proper exposure and the positive and negative labels regarding the improvability. The 2-class determiner is not particularly limited. A classifier of SVM, Logistic Regression, Neural Network, or the like is applicable to the 2-class determiner.

As described above, according to the present exemplary embodiment, the learning apparatus 900 estimates a local field where a category determination error is liable to occur and the error is easily corrected through imaging parameter correction. Then, the learning apparatus 900 acquires a correction image with exposure readjusted to the estimated local field and, in case of a field where the error is not corrected through exposure correction, further acquires the feature quantities from the surrounding of the segment, thus achieving accurate category determination over the entire range of the classification target image.

A third exemplary embodiment will be described below. According to the above-described first and second exemplary embodiments, when an imaging apparatus such as a digital camera acquires images in succession in the imaging preparation state, the imaging parameters are suitably changed according to a recognition result to improve the accuracy of the recognition processing. In recent years, a light field camera (or plenoptic camera) capable of imaging a light space and readjusting the focus as post-processing (refocusing), as discussed in R. Ng, M. Levoy, M. Bredif, G. Duval, M. Horowitz, P. Hanrahan, "*Light field photography with a hand-held plenoptic camera*", Stanford University Computer Science Tech Report CSTR 2005-02, April 2005, has been put in practical use. S. K. Nayar, T. Mitsunaga, "*High Dynamic Range Imaging: Spatially Varying Pixel Exposures*", CVPR2000 discusses an imaging apparatus including a multi-sensitivity image sensor having four different sensitivities from low to high sensitivities in units of R, Gr, Gb, and B patterns of an ordinary image sensor having the Bayer array as illustrated in FIG. 3. This enables generating an image with a high dynamic range from one shot image.

Further, it is possible to theoretically easily achieve an imaging apparatus capable of simultaneously acquiring a multi-focus image and a multi-exposure image through the combination of technology of the above-described light field camera with technology of the imaging apparatus having a multi-sensitivity image sensor. Many of consumer digital cameras currently widespread are provided with an auto bracket function. More specifically, it is also possible to capture multi-imaging-parameter images such as multi-exposure, multi-focus, and multi-flash images by changing imaging parameters in succession on a multi-frame basis.

The third exemplary embodiment will be described below centering on a configuration in which a plurality of exposure values is set on the underexposure and overexposure sides of proper exposure by an auto bracket mechanism, and, when multi-exposure parameter images are captured through collective imaging, these images are used to improve the recognition accuracy. The third exemplary embodiment of the present disclosure will be described below. The same reference numerals are assigned to components which have been described above as components according to the first and the second exemplary embodiments, and descriptions thereof will be omitted.

Figure 19A:
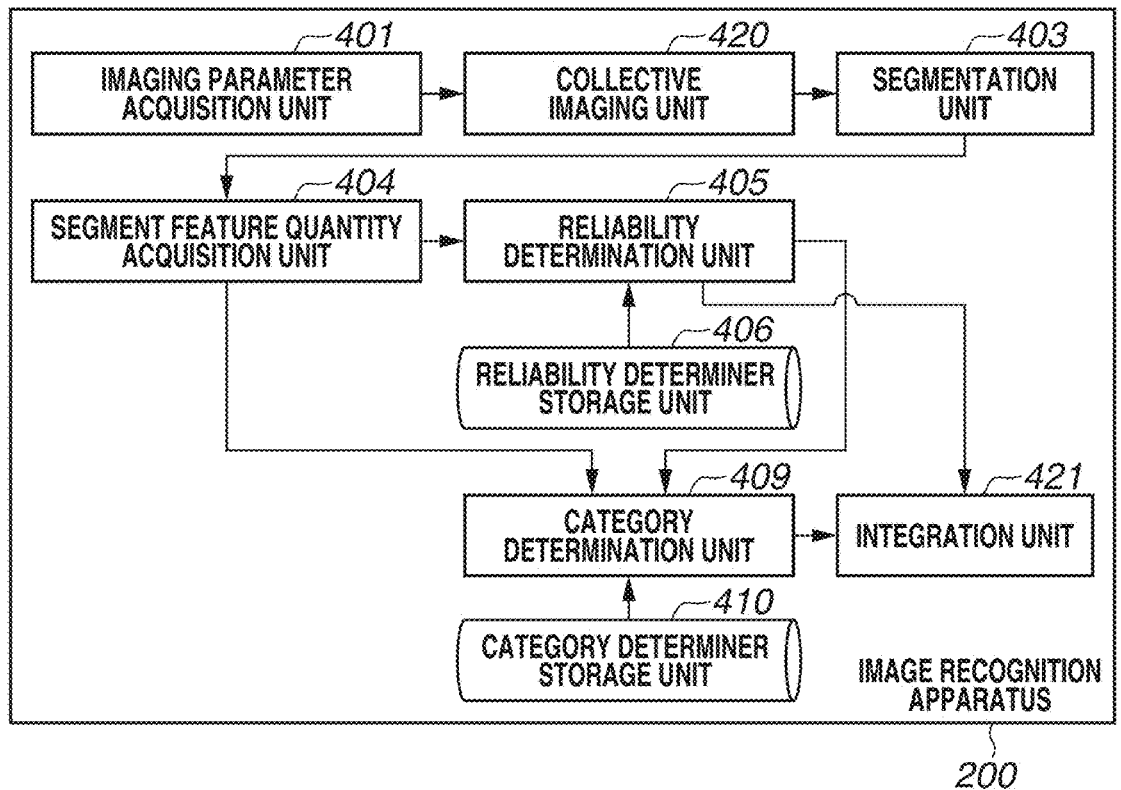
FIGS. 19A and 19B are block diagrams illustrating yet other functional configurations of the image recognition apparatus according to each exemplary embodiment.
Figure 19B:
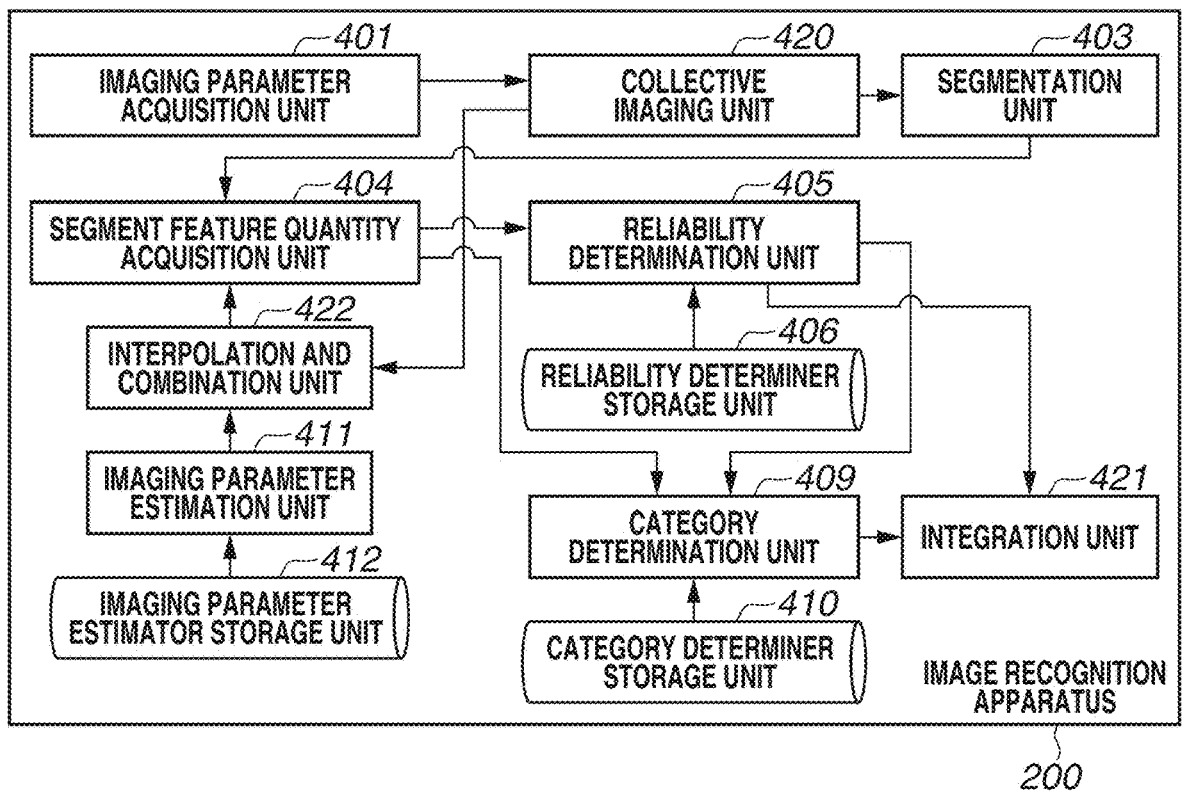

FIGS. 19A and 19B are block diagrams illustrating functional configurations of the image recognition apparatus 200 according to each exemplary embodiment. FIG. 19A is a block diagram according to the present exemplary embodiment. The image processing apparatus 200 according to the present exemplary embodiment includes the imaging parameter acquisition unit 401, a collective imaging unit 420, the segmentation unit 403, the segment feature quantity acquisition unit 404, the reliability determination unit 405, the category determination unit 409, and an integration unit 421. Of these units, the imaging parameter acquisition unit 401, the segmentation unit 403, the segment feature quantity acquisition unit 404, and the reliability determination unit 405 have basically the same functions as the corresponding function units according to the first exemplary embodiment, and detailed descriptions thereof will be omitted. Differences in some functions will be described below. The image recognition apparatus 200 according to the present exemplary embodiment further includes the reliability determiner storage unit 406 and the category determiner storage unit 410 as storage units. These functions included in the image recognition apparatus 200 will be described in detail below with reference to FIGS. 20A and 20B.

FIGS. 20A and 20B are flowcharts illustrating recognition processing by the image recognition apparatus according to each exemplary embodiment. FIG. 20A is a flowchart illustrating recognition processing according to the present exemplary embodiment. The imaging parameter acquisition step S501 performs almost the same processing as the imaging parameter acquisition step S501 in the recognition processing according to the first exemplary embodiment. The imaging parameter acquisition unit 401 acquires main imaging parameters of a plurality of imaging parameters used in collective imaging.

In the collective imaging step S518, the collective imaging unit 420 performs collective imaging with a plurality of imaging parameters centering on the imaging parameters acquired in the imaging parameter acquisition step S501. The segmentation step S503 performs almost the same processing as the segmentation step S503 in the recognition processing according to the first exemplary embodiment. In this step, the segmentation unit 403 performs the above-described processing on a typical image out of images acquired with a plurality of imaging parameters.

The segment feature quantity acquisition step S504 performs almost the same processing as the segment feature quantity acquisition step S504 in the recognition processing according to the first exemplary embodiment. More specifically, for the same segment, the segment feature quantity acquisition unit 404 acquires a plurality of feature quantities based on images acquired with a plurality of imaging parameters. The reliability determination step S505 performs similar processing to the reliability determination step S505 in the recognition processing according to the first exemplary embodiment, and detailed descriptions thereof will be omitted.

The category determination step S509 performs similar processing to the category determination step S509 in the recognition processing according to the first exemplary embodiment. More specifically, the category determination unit 409 performs category determination for all of images acquired with a plurality of imaging parameters. In the integration step S520, using the reliability for each segment acquired in the reliability determination step S505 as a weight, the integration unit 421 performs weighted averaging on results for multi-imaging-parameter images in the category determination step S509 to integrate category determination results with a plurality of imaging parameters.

The following describes in more detail the collective imaging step S518, the segmentation step S503, the segment feature quantity acquisition step S504, the reliability determination step S505, the category determination step S509, and the integration step S520 in the flowchart illustrated in FIG. 18.

In the collective imaging step S518, the collective imaging unit 420 generates parameters for a plurality of exposure conditions and collectively performs imaging with a plurality of imaging parameters a plurality of times. The collective imaging unit 420 generates parameters for a plurality of exposure conditions centering on the AE, AF, and AWB evaluation value maps acquired in the imaging parameter acquisition step S501, and the diaphragm value and shutter speed out of the imaging parameters (diaphragm value, shutter speed, and focus lens position). More specifically, the collective imaging unit 420 generates a plurality of imaging parameters by changing the diaphragm value and shutter speed with the imaging parameters (diaphragm value and shutter speed) acquired with AE set to ±0 (proper exposure). In this case, the collective imaging unit 420 generates diaphragm values and shutter speeds with exposures in four steps in each of the negative and positive directions (−2.0, −1.5, −1.0, −0.5, +0.5, +1.0, +1.5, and +2.0) and proper exposure (±0), i.e., nine different patterns of imaging parameters. In this step, the collective imaging unit 420 collectively captures nine different images with nine different patterns of imaging parameters.

In the segmentation step S503, the segmentation unit 403 performs segmentation for the image captured with proper exposure out of a plurality of images captured in the previous step (collective imaging step S518). Other processing is similar to other processing in the segmentation step S503 according to the first exemplary embodiment, and redundant descriptions thereof will be omitted.

In the segment feature quantity acquisition step S504, the segment feature quantity acquisition unit 404 acquires the segment feature quantities. In this step, the segment feature quantity acquisition unit 404 uses the segment of the image with the proper exposure generated in the previous step (segmentation step S503) also for images captured with other imaging parameters and acquires from each image the feature quantities such as the color feature and textural feature. The same AE evaluation value feature quantity is used for all of captured images because the BV primarily does not vary in exposure correction. The same AF evaluation value feature quantity is also used for all images because it does not vary in exposure correction. Other processing is similar to other processing in the segment feature quantity acquisition step S504 according to the first exemplary embodiment, and redundant descriptions thereof will be omitted.

In a reliability determination step S505, the reliability determination unit S405 determines the reliability of category determination for each segment. In this case, the reliability determination unit S405 determines the reliability for the segment feature quantities for each of a plurality of imaging parameters acquired in the segment feature quantity acquisition step S504. More specifically, for a certain segment, the reliability determination unit S405 performs reliability determination based on the segment feature quantities for each of the nine different patterns of exposure conditions. Other processing is similar to other processing in the reliability determination step S505 according to the first exemplary embodiment, and redundant descriptions thereof will be omitted.

In the category determination step S509, the category determination unit 409 performs category determination based on each of the segment feature quantities for a plurality of imaging parameters. More specifically, for a certain segment, the category determination unit 409 performs category determination based on each of the segment feature quantities for the nine different patterns of exposure conditions. Other processing is similar to other processing in the category determination step S509 according to the first exemplary embodiment, and redundant descriptions thereof will be omitted.

In the integration step S520, the integration unit 421 integrates the results in the category determination step S509. According to the present exemplary embodiment, for each segment, a plurality of segment feature quantities generated based on images captured with a plurality of imaging parameters is acquired, and a plurality of category determination results corresponding to the segment feature quantities is acquired, as described above. These category determination results are associated with the reliability determining results in the reliability determination step S505. In this step, for a certain segment, the integration unit 421 performs weighted averaging on the category determination results for nine segments by using the nine reliability determination results as weights. The resultant category determination score is considered as the final category determination result according to the present exemplary embodiment.

With the above-described configuration, Semantic Segmentation is performed by using images captured with a plurality of imaging parameters collectively acquired by an auto bracket mechanism in an imaging apparatus such as a plenoptic camera or a digital camera. Integrating the category determination results for a plurality of imaging parameters in consideration of respective reliabilities achieves category determination with higher accuracy than in a case where these results are simply integrated.

The present exemplary embodiment has been described above based on the auto bracket mechanism as an example. As described above, even when a computational camera like a plenoptic camera or multi-sensitivity camera is used, it is possible to integrate category determination results for a plurality of imaging parameters, in a similar exemplary embodiment. In addition, high-accuracy Semantic Segmentation (category determination) can be achieved.

Modification of Third Exemplary Embodiment

According to the third exemplary embodiment, the image recognition apparatus 200 determines the segment reliability for images collectively captured with a plurality of imaging parameters and performs weighted averaging in terms of the reliability on category determination results for a plurality of images to calculate the final field category. Although a plurality of parameters according to the third exemplary embodiment includes preset range and granularity, the optimal imaging parameters may not necessarily coincide with the imaging parameters set in this case. For example, when the optimal exposure correction amount of a certain segment is −0.75, and nine different patterns of exposure correction amounts (−2.0, −1.5, −1.0, −0.5, ±0.0, +0.5, +1.0, +1.5, and +2.0) are preset, it is not possible to capture an image with the optimal exposure correction amount for the segment recognition.

The present modification will be described below centering on a configuration for estimating optimal imaging parameters for each segment according to the second modification of the first exemplary embodiment, performing interpolation and combination to form an image captured with the optimal parameters when there is no image captured with the estimated optimal parameters, and performing category determination by using the image.

FIG. 19B is a block diagram illustrating a functional configuration of the image recognition apparatus 200 according to the present modification. The imaging parameter estimation unit 411, an interpolation and combination unit 422, and the imaging parameter estimator storage unit 412 are newly added to the image recognition apparatus 200 according to the third exemplary embodiment. The function of the imaging parameter estimation unit 411 is similar to that of the imaging parameter estimation unit 411 according to the second modification of the first exemplary embodiment, and a description thereof will be omitted.

FIG. 20B is a flowchart illustrating recognition processing by the image recognition apparatus 200 according to the present modification. The imaging parameter estimation step S510, an interpolation and combination step S523, and the segment feature quantity acquisition step S504 are newly added to the flowchart according to the first exemplary embodiment. The imaging parameter estimation step S510 is similar to the imaging parameter estimation step S510 according to the second modification of the first exemplary embodiment, and the segment feature quantity acquisition step S504 is similar to the segment feature quantity acquisition step S504 according to the third exemplary embodiment, and detailed descriptions thereof will be omitted.

In the interpolation and combination step S523, the interpolation and combination unit 422 forms an image with the imaging parameters estimated in the imaging parameter estimation step S510 by interpolating neighboring images. When handling the imaging parameters related to exposure in this case, linear interpolation on two neighboring images is to be performed when the estimated imaging parameters fall within a preset range of exposure correction.

Assume an example in which the optimal exposure correction amount for a certain segment is −0.75, and nine different patterns of exposure correction amounts (−2.0, −1.5, −1.0, −0.5, ±0.0, +0.5, +1.0, +1.5, and +2.0) are preset. In this case, the interpolation and combination unit 422 combines two images captured with the exposure correction values −1.0 and −0.5 through linear interpolation to form the image captured with the correction value −0.75. When the estimated imaging parameters are outside the range of exposure correction, an image captured with the nearest neighboring correction value is used as a substitute image.

Likewise, an image cannot be linearly interpolated for focus correction. Therefore, for example, the segment feature quantities of images for the correction values set in collective imaging are approximated by using a secondary function for each segment and the segment features for the estimated imaging parameters are estimated. Likewise, for the reliability corresponding to images captured with the estimated imaging parameters, the reliability for the correction values set in collective imaging are approximated by using a secondary function for each segment and the reliability with the estimated imaging parameters is estimated.

The above-described configuration makes it possible to form an image with the optimal parameters through interpolation and combination even when the imaging parameters set in collective imaging do not coincide with the optimal imaging parameters in segment category determination. Then, the final recognition accuracy can be improved by performing category determination by using an image formed through interpolation and combination.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-128958, filed Jun. 30, 2017, which is hereby incorporated by reference herein in its entirety.

What is claimed is:

1. An apparatus comprising:
one or more processors; and
a memory for storing programs to be executed by the one or more processors, wherein the programs stored in the memory cause, when executed by the one or more processors, the one or more processors to operate to:
acquire, as an image acquisition, a first image captured by an imaging unit based on a first parameter, and a second image captured by the imaging unit based on a second parameter;
segment, as a first segmentation, each of the first image and the second image into a plurality of segments;
acquire, as a feature acquisition, features from each of the plurality of segments formed by segmenting the first image and the second image, respectively;
calculate, as a calculation, a reliability of each of the plurality of segments of the first image based on the features acquired from the plurality of segments of the first image;
classify, as a classification, the plurality of segments of the first image into a first field having a relatively high reliability and a second field having a relatively low reliability; and
determine, as a first determination, a category for the first field based on the features acquired from the first image and a category for the second field based on the features acquired from the second image.

2. The apparatus according to claim 1, wherein the second image is acquired based on the second parameter which is a parameter set based on the second field.

3. The apparatus according to claim 1, wherein the first image and the second image captured in advance by the imaging unit based on the first parameter and the second parameter, respectively.

4. The apparatus according to claim 1, wherein the determination determines the categories for the first field and the second field by using the reliability of the first field and the reliability of the second field as weights.

5. The apparatus according to claim 1, wherein the one or more processors further operate to:
calculate, as a correction, a moving vector from images of a plurality of frames captured in succession by the imaging unit and correct the determined categories.

6. The apparatus according to claim 5, wherein the correction interpolates, by using categories of surrounding segments, the category of the segment where the category cannot be corrected based on the motion vector.

7. The apparatus according to claim 1, wherein the one or more processors further operate to:
determine, as a second determination, a degree of an improvability from a first reliability determined based on the first image to a second reliability determined based on the second image in each of the plurality of segments, and
wherein, the first determination unit determines categories for the segment having a relatively low degree of the improvability based on features acquired from fields including surrounding the segment.

8. The apparatus according to claim 1, wherein the one or more processors further operate to:
based on the first image, generate, as a generation, at least one of information about an exposure evaluation by the imaging unit and information about a focus evaluation value by the imaging unit, and
wherein the calculation calculates the reliability further based on the generated information.

9. The apparatus according to claim 8, wherein the generation generates the information about the exposure evaluation or the information about the focus evaluation value as map information having same resolution as the first image.

10. The apparatus according to claim 9, wherein the feature quantities include at least one of a feature related to an image color, a feature related to an image texture, and a feature related to the map information.

11. The apparatus according to claim 1, wherein the classification classifies the plurality of segments into the first field and the second field by comparing the reliability with a threshold value.

12. The apparatus according to claim 1, wherein the first parameter and the second parameter include at least one of an exposure, a focus, and a white balance.

13. The apparatus according to claim 1, wherein, based on the first parameter and the second parameter, the imaging unit captures the first image and the second image, respectively, with differentiated diaphragm values and shutter speeds.

14. The apparatus according to claim 1, wherein the one or more processors further operate to:
capture, as the imaging unit, the first image and second image.

15. A method comprising:
acquiring a first image captured by an imaging unit based on a first parameter, and a second image captured by the imaging unit based on a second parameter;
segmenting each of the first image and the second image into a plurality of segments;
acquiring features from each of the plurality of segments formed by segmenting the first image and the second image, respectively;
calculating a reliability of each of the plurality of segments of the first image based on the features acquired from the plurality of segments of the first image;
classifying the plurality of segments into a first field having a relatively high reliability and a second field having a relatively low reliability; and
determining a category for the first field based on the features acquired from the first image and a category for the second field based on the features acquired from the second image.

16. A non-transitory computer-readable storage medium storing a program for causing a computer to function as:
an image acquisition unit configured to acquire a first image captured by an imaging unit based on a first parameter, and a second image captured by the imaging unit based on a second parameter;
a segmentation unit configured to segment each of the first image and the second image into a plurality of segments;
a feature acquisition unit configured to acquire features from each of the plurality of segments formed by segmenting the first image and the second image, respectively;
a calculation unit configured to calculate a reliability of each of the plurality of segments of the first image based on the features acquired from the plurality of segments of the first image;
a classification unit configured to classify the plurality of segments of the first image into a first field having a relatively high reliability and a second field having a relatively low reliability; and
a determination unit configured to determine a category for the first field based on the features acquired from the first image and a category for the second field based on the features acquired from the second image.

\* \* \* \* \*